(12) United States Patent
Penkalski et al.

(10) Patent No.: US 7,698,190 B2
(45) Date of Patent: Apr. 13, 2010

(54) METHOD OF CREATING FINANCIAL PLANS OF ACTION AND BUDGET FOR ACHIEVING LIFESTYLE AND FINANCIAL OBJECTIVES

(76) Inventors: Thomas A. Penkalski, 1261 Valley Park Dr., Broadview Heights, OH (US) 44147; Thomas A. Hollins, 14703 S. Boone Rd., Columbia Station, OH (US) 44028; Debra A. Coljohn, 242 Windham Ct., Broadview Heights, OH (US) 44147

( * ) Notice: Subject to any disclaimer, the term of this patent is extended or adjusted under 35 U.S.C. 154(b) by 0 days.

(21) Appl. No.: 11/706,174

(22) Filed: Feb. 15, 2007

(65) Prior Publication Data
US 2008/0201269 A1    Aug. 21, 2008

(51) Int. Cl.
*G06Q 40/00*   (2006.01)
(52) U.S. Cl. .......................................... 705/35; 705/37
(58) Field of Classification Search .............. 705/35–45
See application file for complete search history.

(56) References Cited

U.S. PATENT DOCUMENTS 5,182,793  A   1/1993  Alexander et al.
6,957,191  B1  10/2005 Belcsak et al.
2002/0073005 A1*  6/2002  Welnicki et al. .............. 705/35
2002/0123949 A1*  9/2002  VanLeeuwen ................. 705/35
2002/0156710 A1* 10/2002  Ryder ........................... 705/35
2005/0096973 A1*  5/2005  Heyse et al. ................... 705/11

OTHER PUBLICATIONS

Susanne Ruder. (Dec. 2005). Making it last. MoneySense, 7(6), S34. Retrieved Sep. 28, 2009, from ABI/INFORM Global. (Document ID: 939417111).*
Our Opinions: Consumers can't balance budgets :[Main Edition]. (Mar. 6, 2006). The Atlanta Journal—Constitution,p. A. 12. Retrieved Sep. 28, 2009, from Business Dateline. (Document ID: 997715321).*
Thomas S. Brown—Business Writer. (Jan. 1, 2005). For financial planners, a new year can mean a . . . Fresh startSetting priorities good way to reach goals :[Final Edition]. News Journal,p. 01B. Retrieved Sep. 28, 2009, from Business Dateline. (Document ID: 773775951).*
By Sue Shellenbarger. (Feb. 24, 1999). Students Get Lessons In How to Manage A Well-Balanced Life. Wall Street Journal (Eastern Edition), p. B1. Retrieved Sep. 28, 2009, from ABI/INFORM Global. (Document ID: 39214845).*

* cited by examiner

*Primary Examiner*—Alexander Kalinowski
*Assistant Examiner*—Abhishek Vyas

(57) ABSTRACT

A software program that allows an individual with a personal computer to develop and implement plans of action for achieving a preferred lifestyle that appears feasible based on the individual's current and probable future financial circumstances.

1 Claim, 5 Drawing Sheets

METHOD OF CREATING FINANCIAL PLANS OF ACTION AND BUDGET FOR ACHIEVING LIFESTYLE AND FINANCIAL OBJECTIVES

FIELD OF INVENTION

This invention relates to a method of creating and providing guidance for implementing financial plans of action and a budget for achieving lifestyle and financial objectives. More specifically, this invention relates to the use of information relating to a person's stage of life, current lifestyle and financial circumstances to prepare financial plans of action and a budget relating to the user's lifestyle, predict the financial consequences of implementing specific actions, and provide education and guidance regarding financial planning and the plans of action.

Background of Invention

SUMMARY OF THE INVENTION

When used herein, the terms user, users and possessives thereof includes the members of a family or other household economic unit.

The invention herein described uses a software based financial planner that may be executed on a personal computer to create and present to a user plans of financial action and a budget that are consistent with the user's financial circumstances and preferred lifestyle, and provides guidance to the user for further financial planning and achieving the user's preferred lifestyle and financial objectives.

The plans of financial action identify specific actions that, when implemented, allow a user to purchase or otherwise acquire goods and services that the user needs or desires and are consistent with the user's preferred lifestyle and probable financial circumstances.

The invention also creates and presents charts and graphs that reflect the user's current and future financial circumstances and objectives.

Specifically, the present invention defines a method of creating and implementing financial plans of action that includes the following steps:

1. Collecting and storing facts provided by a user regarding the user's stage of life, geographic location and financial circumstances,
2. Collecting facts, deriving inferences and storing information regarding the user's current and preferred lifestyles, current and probable future financial circumstances and financial objectives,
3. Developing, presenting to the user and storing a plan of financial action and budget that are consistent with the facts given and inferences derived regarding user's stage of life, preferred lifestyle, probable future financial circumstances and financial objectives,
4. Calculating and presenting to the user the effects on the user's probable future financial circumstances and financial objectives of implementing the plans of action,
5. Identifying, and suggesting solutions to, problems with the user's plans of action, financial circumstances and financial objectives,
6. Providing the user with education, guidance and mentoring designed to correct or avoid problems in respect of the user's plans of action, financial circumstances and financial objectives, and
7. Identifying sources and prices of goods and services for implementing the user's plans of action.

Additionally, the invention includes providing the user with a mathematical probability that the plans of financial action and financial budget presented to the user can be successfully implemented given the facts and inferences relating to the user's preferred lifestyle, current and probable future financial circumstances, and financial objectives.

The invention also provides the user with information regarding goods and services pertinent to the implementation of the user's plans of action and financial budget, including comparisons of prices, quality, source and location of goods and services required to implement the plans of action, and presenting to the user advertisements and information by potential vendors regarding such goods and services that are consistent with the user's lifestyle, financial circumstances and financial objectives.

The invention further provides the user with financial education and mentoring for the user in connection with general and specific assistance regarding financial education, issues, decisions and choices pertinent to the user's financial circumstances, life stage, lifestyle, plans of action and errors or omissions in the user's financial plans which are not in accord with best practices. The mentoring may be provided using computer simulation techniques, audio or video recordings made available using databases stored on an accessible computer or in live instant messaging, chat room, telephone, or video conferencing.

Prior Art

There are user-oriented, financial-assistance and informational products and services that operate over the Internet, and more that operate independent of the Internet from CD/DVDs and user input. Typical of these products are Microsoft Corporation's Money® banking and financial software, Intuit's TurboTax® federal and state tax advice and calculation programs, and Intuit's Quicken® banking and financial software. In general, the above products are related to (i) providing non-numerical information and advice, (ii) providing a means of making isolated and simple calculations [e.g., calculating mortgage payments], (iii) calculating savings, retirement funds and net worth, (iv) calculating income taxes, and/or (v) providing a way to maintain financial records. The above programs do not attempt to determine and use a user's stage of life, lifestyle and financial circumstances to assist in creating a financial plan of action and understanding the consequences of the user's future financial actions.

DESCRIPTION OF PREFERRED EMBODIMENT

Hardware and Discussion of the Invention

This invention relates to a method of creating, and providing guidance for implementing financial plans of action. The method of the present invention includes the following steps:

1. Collecting and storing facts provided by a user regarding the user's stage of life, geographic location and financial circumstances,
2. Collecting facts, deriving inferences and storing information regarding the user's current and preferred lifestyles, current and probable future financial circumstances and financial objectives,
3. Developing, presenting to the user and storing a plan of action and financial budget that are consistent with the facts given and inferences derived regarding user's stage of life, preferred lifestyle, probable future financial circumstances and financial objectives,
4. Calculating and presenting to the user the effects on the user's probable future financial circumstances and financial objectives of implementing the plans of action,
5. Identifying, and suggesting solutions to, problems with the user's plans of action, financial circumstances and financial objectives,
6. Providing the user with education, guidance and mentoring designed to correct or avoid problems in respect of the user's plans of action, financial circumstances and financial objectives, and
7. Identifying sources and prices of goods and services for implementing the user's plans of action.

Figure 1:
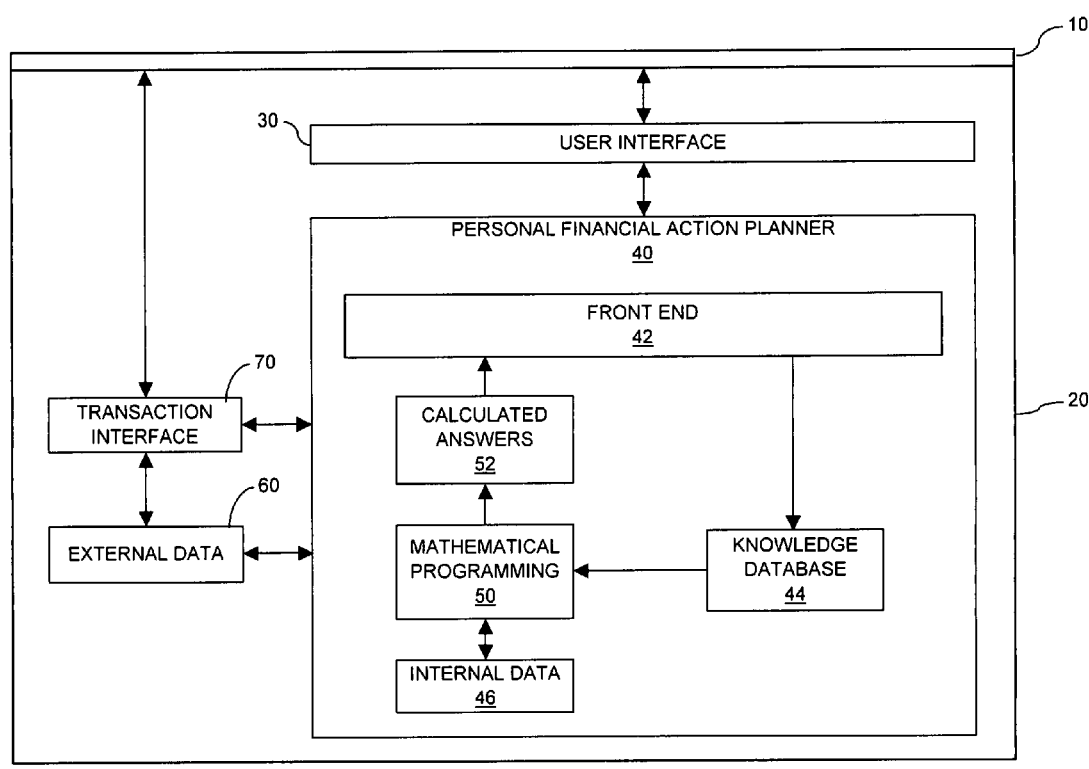
FIG. 1 is a schematic of a computer and software system that can be used to practice the present invention.

FIG. 1 represents one version of a computer and software system that can be used in practicing the present invention.

Figure 2:
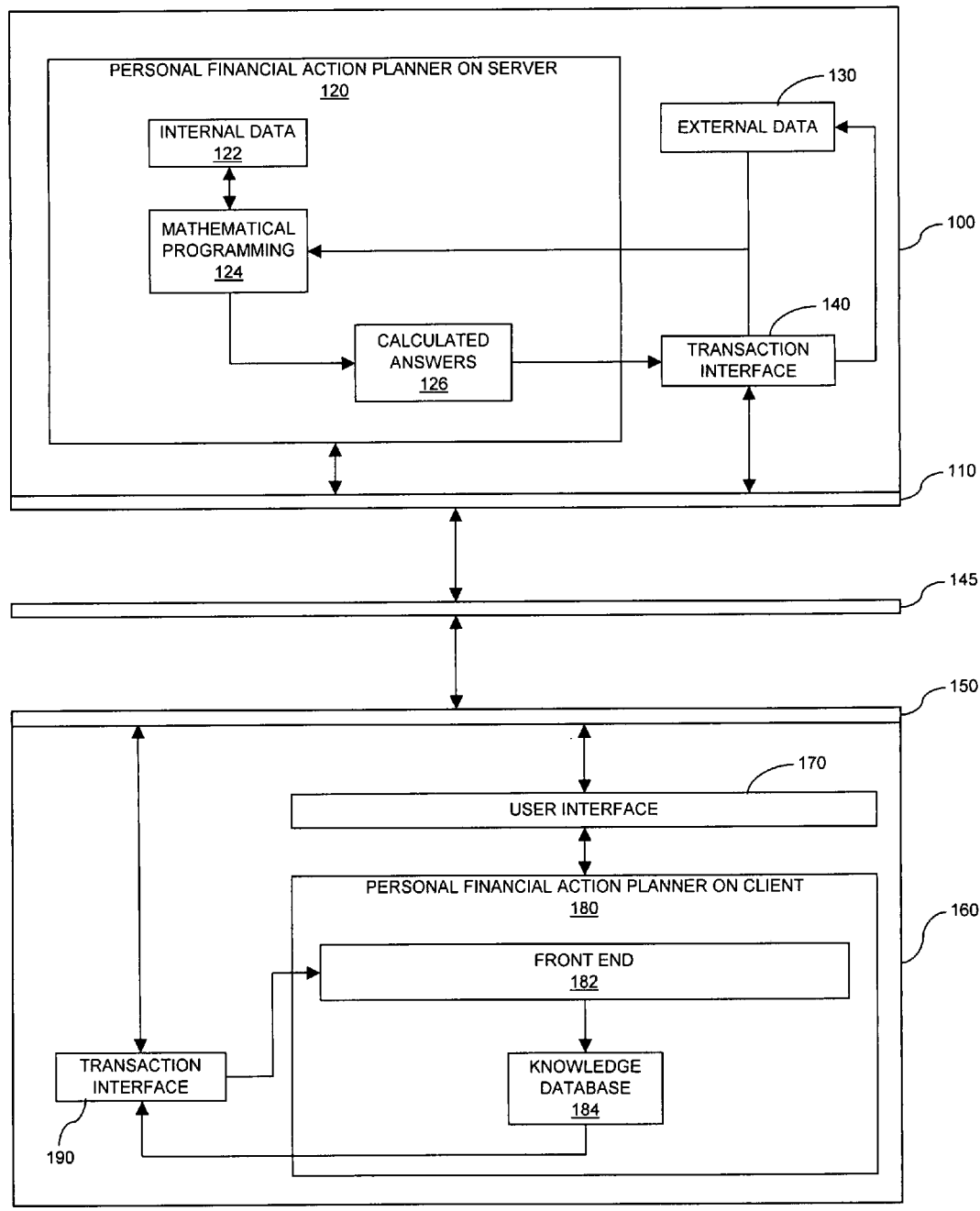
FIG. 2 is an alternative computer and software system that can be used to practice the present invention.

FIG. 2 represents an alternative computer system that can be used in practicing the present invention.

Referring to FIG. 1, the invention is practiced using a computer and financial action planning software ("the planner 40"). The planner 40 is an integral part of the invention and can be used, and thus the invention can be practiced, by an user using a personal computer having (i) access to a CD/DVD that holds the planner 40 and other data, where the planner 40 and the other data are structurally and functionally interrelated to the CD/DVD, (ii) access to the Internet and a CD/DVD that holds the planner 40 and other data, both of which are structurally and functionally interrelated to the CD/DVD, or (iii) access to the Internet or a database on a CD/DVD and the planner 40 loaded into random access memory ("RAM") on the computer.

The computer system represented in FIG. 1 is identified with reference number 20. Computer system 20 is typical of what is commonly known as a "personal computer" and has a number of mechanical, electrical and electronic components, including user interface 30 such as a keyboard or microphone, transaction interface 70 such as a telephone or cable modem, and access to external data 60 such as information from an internal or external disc or the Internet. The computer system 20 will also have operating system software and the planner 40. Such components deliver and receive information to and from each other by means of a bus 10 and other communication means. In addition, computer system 20 has other components [not shown] typical of commonly known computer systems. For example, internal RAM other than that used for temporary storage of external data 60 and an operating systems, utility programming, and a timer will provide timing functions.

User interface 30, monitor and the operating system software provide access to the computer system 20 for a user. The access allows a user to practice the invention. User interface 30 allows input through a keyboard, microphone, disc, network or other input device, and output through any of several well known display devices such as a computer monitor, image projector or printer (not shown).

One purpose of transaction interface 70 is to permit data used by computer system 20 to be kept current with events that occur within the domain of the operation such as databases on discs or the Internet. Therefore, transaction interface 70 is in communication with the planner 40 and external data 60. The communication can be used to channel information from outside system(s) such as discs and the Internet into the planner 40 and external data 60. Another purpose of transaction interface 70 is to transfer information based on decisions made using the planner 40 from computer system 20 to an outside system such as a server or other computer device available through a local or wide area net or the Internet. The hardware associated with transaction interface 70 may be one or more of a number of well-known input/output and other devices designed for the functions herein described such as a router or telephone or cable modem.

External data 60 includes data that is obtained from any source(s) outside of computer system 20 such as a disc, server or other computer on a local or wide area network, the Internet or otherwise. The hardware associated with external data 60 may be any disc drive, computer, server, or other device capable of storing digital information.

The components of the planner 40 include a front end 42, knowledge database 44, internal data 46, mathematical programming 50, communication device, a main software program for creating monitor screens and accepting input from a user, and rules and inference engine, and mathematical formulae for providing calculated answers 52. The hardware associated with the planner 40 includes various devices that are part of computer system 20. Such devices include any computer memory device(s) that allows computer system 20 to electronically store instructions and data [not shown] and any device capable of executing stored instructions, such as a microprocessor [not shown] and performing communications both within and externally of the computer system 20.

Computer front end 42 provides a user-friendly interface to the invention's main software program, knowledge database 44, mathematical programming 50, internal data 46, external data 60 and calculated answers 52.

Knowledge database 44 includes data that is supplied by the user. Such data is supplied by the user through a keyboard, microphone, or from a disc or other memory device. The user enters data into a knowledge database 44 through the front end 42. The main software program of the planner 40 and inference engine software, and mathematical programming 50 to supply the derived and calculated answers 52 then uses the data in the knowledge database 44.

Internal data 46 is data used by mathematical programming 50 as a set of configuration parameters.

Mathematical programming 50 is made up of software instructions to manipulate user-entered data in the knowledge database 44, internal data 46 and external data 60. Calculated answers 52 are based on such manipulations.

FIG. 2 represents another version of a computer system that can be constructed to allow the practice of the present invention. The computer system consists of a server computer system 100 and a client computer system 160. Server system 100 and client system 160 communicate through communication system 145.

Server system 100 has a number of components, including transaction interface 140, external data 130 and a main software program for planner 120. Such components deliver and receive information to and from each other by means of a bus 110 and other communication means. In addition, server system 100 has other components [not shown] typical of computer systems commonly in use. For example, memory other than that used for external data 130 stores data and programming, and a timer provides timing functions. The main software program for planner 120 is similar to its counterpart used in the planner 40 except that the main software program for planner 120 is configured to run on the computer system of FIG. 2.

One purpose of transaction interface 140 is to permit data used by server system 100 to be kept current with events that occur within the domain of the operation of the planner 120. Therefore, transaction interface 140 is in communication with external data 130. The communication can be used to channel information from an outside system(s) into the external data 130. Mathematical programming 124 then uses data from the external data 130.

Another purpose of transaction interface 140 is to channel information from server system 100 to an outside system(s), such as client system 160. Therefore, transaction interface 140 is in communication with calculated answers 126 of the planner 120. The communication can be used to transfer information and calculated answers from the planner 120 to client system 160.

A further purpose of transaction interface 140 is to receive information sent from client system 160 to server system 100. Therefore, transaction interface 140 is in communication with the planner 120. The communication can be used to channel the data in knowledge database 184 [in client system 160] for use in mathematical programming 124 on server system 100.

The hardware associated with transaction interface 140 may be any one of a number of well-known input/output and other devices such as a router or telephone or cable modem designed for the communications functions herein described.

External data 130 includes data that is obtained from a source(s) outside of server system 100. External data 130 includes data that is necessary to keep server system 100 current with events that occur within the domain of the operation, such as recent U.S. census numbers and other information pertinent to full use of the planner 120 such as information on suppliers of goods and services useful in the implementation of plans of action developed by the planner 120. The hardware associated with external data 130 may be any device for electronically storing information.

The components of planner 120 include internal data 122, mathematical programming 124 and calculated answers 126. The hardware associated with the planner 120 includes various devices that are part of server system 100. Such devices include any device(s) that allows the server system 100 to electronically store instructions and data [not shown] and any device capable of executing stored instructions, such as a microprocessor [not shown].

Internal data 122 includes data used by mathematical programming 124 as a set of configuration parameters.

Mathematical programming 124 is made up of filters and instructions to manipulate data contained in internal data 122, external data 130 and any user-entered data supplied by client system 160 through transaction interface 140. The calculated answers 126 are based on such manipulations.

Client system 160 has a number of components, including user interface, 170, transaction interface 190 and the planner 180. Such components deliver and receive information to and from each other by means of a bus 150 and other communication means. In addition, client system 160 has other components [not shown] typical of a computer system commonly in use. For example, memory stores data and programming, and a timer provides timing functions.

User interface 170 provides access for a user to the functions of the invention. User interface 170 allows input through a keyboard or some other input device, and output though a display device such as a computer monitor, projector, printer etc.

One purpose of transaction interface 190 is to channel information from client system 160 to server system 100. Therefore, transaction interface 190 is in communication with the planner 180. The communication can be used to transfer data from knowledge database 184 on the client system 160 for use in the planner 120 on the server system 100.

Another purpose of the transaction interface 190 is to receive calculated answers 126 sent from server system 100 to client system 160. Transaction interface 190 channels the calculated answers 126 received from the planner 120 on server system 100 to the planner 180 on client system 160.

The hardware associated with transaction interface 190 may be any one of a number of well-known input/output and other peripheral devices designed for the functions herein described such as a router or telephone or cable modem.

The components of the planner 180 include front end 182 and knowledge database 184. The hardware associated with the planner 180 includes various devices that are part of client system 160. Such devices include any device(s) that allows client system 160 to electronically store instructions and data [not shown] and any device capable of executing stored instructions, such as a microprocessor [not shown].

Front end 182 provides a user-friendly interface to user-entered knowledge database 184 and calculated answers 126 supplied from server system 100.

Knowledge database 184 includes data that is supplied by the user. The user enters data into the knowledge database 184 through the front end 182. Mathematical programming 124 on server system 100 then uses the user-entered data from knowledge database 184 to supply calculated answers 126. Transaction interface 140 then sends calculated answers 126 from server system 100 to the planner 180 on client system 160.

Calculated answers 126 are supplied to client system 160 through transaction interface 140. Transaction interface 140 on server system 100 and transaction interface 190 on client system 160 communicate through a communication system 145.

Figure 3:
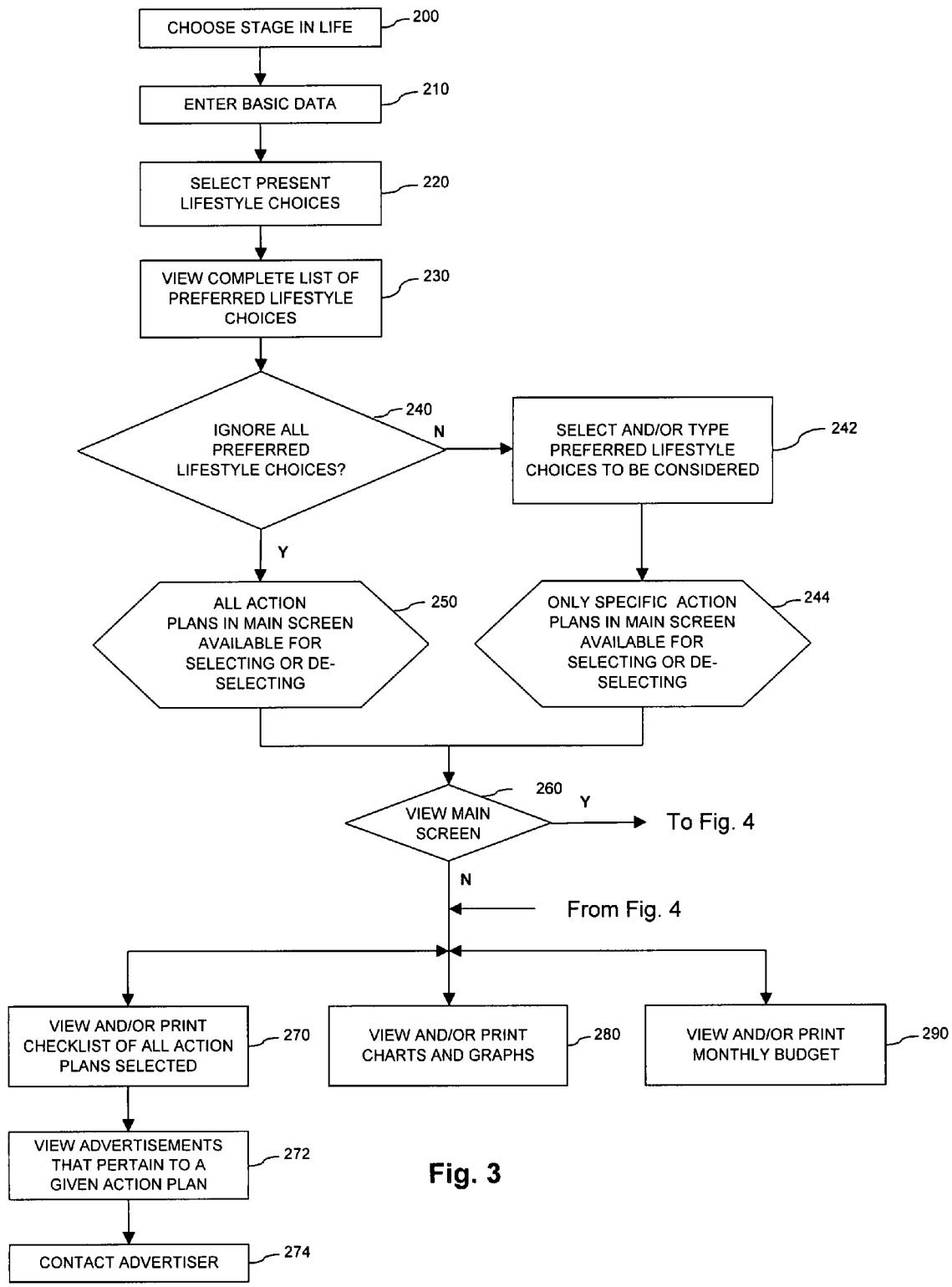
FIG. 3 is a flow chart illustrating a portion of the method of practicing the present invention.
Figure 4:
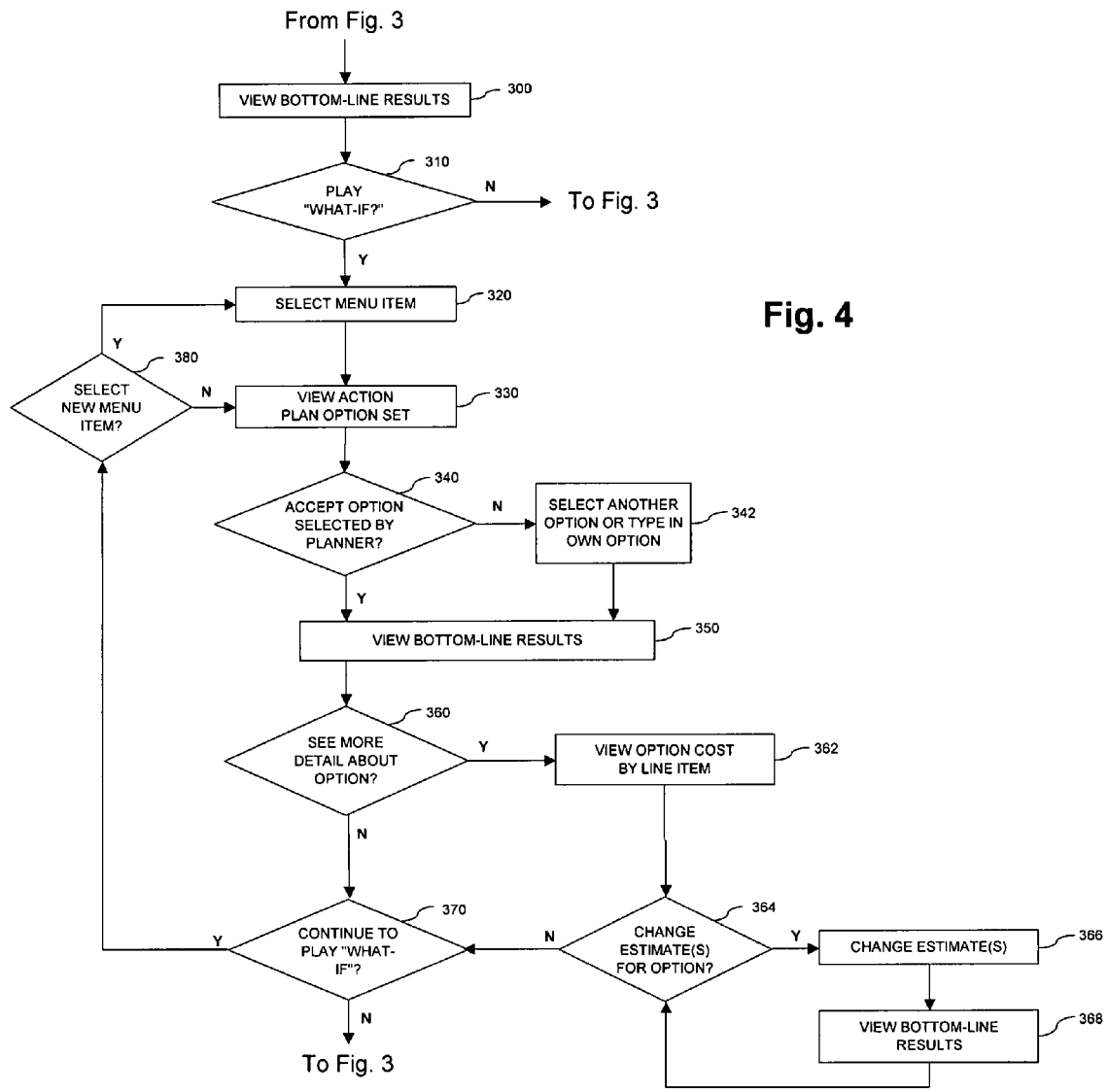
FIG. 4 is a flow chart illustrating another portion of the method for practicing the present invention.

FIGS. 3 and 4 show the process flow used in the planner 40 in the computer system 20 of FIG. 1 and used in planners 120 and 180 in the client/server computer system 100 and 160 of FIG. 2. The process shown in FIGS. 3 and 4 applies equally to the planner 40 in FIG. 1 or the planner made up of planners 120 and 180.

In message, selection and input box 200 in FIG. 3 the user chooses the stage in life that best describes the user's stage in life. Examples of such stages are (i) adolescent, (ii) early adulthood, (iii) adult without children, (iv) adult with children, (v) adult with children but the nest is emptying or is empty, and (vi) retired. The user's stage of life selection is stored as user-entered data in the knowledge database 44 in FIG. 1 and knowledge database 184 in FIG. 2.

In a monitor screen representing message, selection and input box 210 in FIG. 3 the user enters basic personal and financial data by answering questions about his or her family or household. Such data includes, by way of example, the postal zip code, number of dependents, monthly income, monthly mortgage payments and the dimensions of the home. The user's basic data is stored as user-entered data (hereinafter called "given facts") in knowledge database 44 in FIG. 1 or in knowledge database 184 in FIG. 2, depending on which planner is being used. To help in protecting the user's privacy, questions pertaining to highly personal data such as the user's name, address, and social security number are not asked nor is data related thereto required or included anywhere in the planner 40 in FIG. 1 or in the combination of planners 120 and

180 in FIG. 2. In fact, the user need not enter any of the data, except for his or her postal zip code. If the user chooses to enter only the postal zip code, then, by using artificial intelligence techniques, the planner will derive facts about the user and the family or household members based only on the user's stage of life, the postal zip code, data the planner created from experiences obtained from previous users of the planner and stored in the knowledge database, and external data that pertains to the user's given and derived facts. Artificial intelligence techniques are part of the mathematical programming 50 of FIG. 1 and the mathematical programming 124 of FIG. 2.

In the monitor screen representing message, selection and input box 220 the user selects answers to a set of questions designed to allow the user to categorize his or her lifestyle. The planner 40 in FIG. 1, or the combination of planners 120 and 180 in FIG. 2, will customize the question set presented to the user based on the stage in life that the user identifies in message, selection and input box 200, the given facts that the user enters in message, selection and input box 210, applicable external data taken from other databases, and additional inferences that the planner derives by applying artificial intelligence techniques to the user's stage of life in message, selection and input box 200, the user's basic data in message, selection and input box 210 and the external data. Changing the stage of life in box 200 or any of the basic data in box 210 may cause the planner 40 or planner 120 in combination with planner 180 to revise the questions that are presented to the user. To that end, the planner stores the user's answers to the current lifestyle questions as user-entered data in knowledge database 44 in FIG. 1 or knowledge database 184 in FIG. 2, checks for changes in the stage of life and/or basic data, and changes the data in user-entered given facts in knowledge database 44 in FIG. 1 or user-entered given facts in knowledge database 184 in FIG. 2.

In a monitor screen representing message, selection and input box 230 the user can view a list of financially oriented scenarios, i.e., preferred lifestyle choices, that the user may want to consider now or in the future. The planner 40 in FIG. 1 and the combination of planners 120 and 180 in FIG. 2 will customize that list of lifestyle choices for the user by applying mathematical calculations, filters, rules and inference engines, and other artificial intelligence programming to the user's entries in message, selection and input boxes 200, 210, and 220, applicable external data, and inferred facts may be obtained from internal or external databases or derived by the planner using mathematical calculations and an inference engine.

If, in the monitor screen representing decision box 240, the user decides to ignore all preferred lifestyle choices available in decision box 230, then the planner 40 in FIG. 1 and the combination of planners 120 and 180 in FIG. 2 will prepare themselves in accordance with logic rules contained in box 250.

Conversely, if in the decision box 240 the user decides not to ignore the preferred lifestyle choices seen in decision box 230 and (i) selects those preferred lifestyle choices that apply to the user, his family or members of the household, or (ii) types in preferred lifestyle choices, the information provided to the user will be determined by the logic rules set out in box 242. If the user types in his or her own preferred lifestyle choices, then the planner 40 in FIG. 1 and the combination of planners 120 and 180 in FIG. 2 will use artificial intelligence including rules and inference engines, natural programming and mathematical calculations to predict what statement the user is making about his or her preferred lifestyle and verify the conclusion with the user before including the lifestyle choice in the final preferred lifestyle choices to be considered. The planner stores the user's selection of financially oriented scenarios in knowledge database 44 in FIG. 1 or knowledge database 184 in FIG. 2.

After the user selects the preferred lifestyle choices that apply in the monitor screen representing message, selection and input box 242 or types his or her preferred lifestyle choices in message, selection and input box 242, then the planner 40 in FIG. 1 and the combination of planners 120 and 180 in FIG. 2 will react in accordance with the planner software rules set out in box 244.

Decision box 260 indicates that regardless whether the planner 40 in FIG. 1, or the combination of planners 120 and 180 in FIG. 2, react in accordance with the rules of the planner software set out in box 250 or box 244, the user can decide to view or not view the actions created by the planner.

With the planner 40 in FIG. 1, or the combination of planners 120 and 180 in FIG. 2, in the monitor screen representing message, selection and input box 270 the user has the opportunity to view and/or print a listing of all actions derived and calculated by the planner. The plan of action checklist shows, in one document, the items that make up the user's financial picture based on the actions that may be selected by the user for future implementation.

In the planner 40 in FIG. 1, or the combination of planners 120 and 180 in FIG. 2, next to each action in the plan of action is a "Shop" option. Choosing the Shop option will bring the user to message, selection and input box 272, where a list of advertisers and vendors specific to a given individual action is displayed. If the user chooses a vendor in message, selection and input box 272, in message, selection and input box 274 the user can use the information provided to contact the vendor and initiate activation of the actions. The user may initiate the actions via the Internet, voice over Internet, telephone, or by other means that notify the vendor and initiate activation of the actions.

With the planner 40 in FIG. 1, or the combination of planners 120 and 180 in FIG. 2, on the monitor screen representing message, selection and input box 280 the user has the opportunity to view and/or print charts and graphs that illustrate the user's financial circumstances including income, a financial budget of expenses, and a prediction of the mathematical probabilities of achieving the financial objectives of a plan of action while maintaining a selected preferred lifestyle and with the user's current and projected financial resources. Such financial resources are based on the user-entered data, and the decisions made by the user in message, selection and input boxes 200, 210, 220, 242 of FIG. 3.

After viewing the results, the user may decide to engage in "What-if?" analysis with his or her financials, as represented by FIG. 4. The user starts the "What-if?" process by viewing the bottom-line results shown in message box 300 of FIG. 4. The bottom-line results represent the user's financials such as projected savings and the mathematical probability of attaining those results given the user's stage of life and the household's preferred lifestyle. Planner 40 in FIG. 1 and the combination of planners 120 and 180 in FIG. 2 mathematically calculated the bottom-line financials and mathematical probabilities by using the data that was entered by user in the previous screens, experience-based data collected from other users, external data that pertains to the user and was obtained from other databases and/or provided by suppliers of relevant goods and services, and facts that the planner derived from the basic, internal and external data using filters, rules, mathematical calculations, natural programming, and artificial intelligence techniques.

If in decision box 310 the user decides not to engage in a "What-if?" analysis, the user will go back to FIG. 3 and have the opportunity to go to boxes 270, 280 and 290.

If in decision box 310 the user decides to engage in a "What-if?" analysis, the planner 40 in FIG. 1, or the combination of planners 120 and 180 in FIG. 2, move to message, selection and input box 320, where the user initiates the "What if?" analysis by selecting an item to change from a menu or submenu. In box message, selection and input box 330 a set of actions, typically comprising three to eight options, is attached to each menu and/or submenu item in message, selection and input box 320. For example, the set of actions attached to the menu item "Furnishings" are choices "I want inexpensive used furniture", "Second-hand furniture is fine with me" and "I want new exclusive top-of-the-line furniture". One of the options in the set allows the user to type in his or her own action, in which case the planner 40 in FIG. 1 or the combination of planners 120 and 180 in FIG. 2 will use filters, rules, artificial intelligence, natural programming and mathematical calculations to infer the action the user is asking for and verify its findings with the user before using the action. The planner store the actions selected in message, selection and input box 330 as user-entered data in knowledge database 44 in FIG. 1 or knowledge database 184 in FIG. 2, whichever is appropriate.

The menus and submenus in message, selection and input box 320 and each set of actions that is attached to each menu and submenu item in message, selection and input box 330 allow the user to engage in "What-if?" analysis with any and all subjects that affect his or her financial life. If in decision box 240 of FIG. 3 the user chooses to ignore all financially oriented scenarios of the preferred lifestyle choices, then every menu and submenu item and every action in message, selection and input boxes 320 and 330 in FIG. 4 will be available to the user for viewing and/or engaging in "What-if?" analysis.

If in decision box 240 the user decides not to ignore all scenarios for preferred lifestyle choices, then the planner 40 in FIG. 1, or the combination of planners 120 and 180 in FIG. 2 will make available for viewing and engaging in "What-if?" analysis only those menu and submenu items shown in message, selection and input box 320 and actions in message, selection and input box 330 that correspond to the choices selected or typed in message, selection and input box 242. The planner being used also shows its estimates of the cost of each action, which the planner bases on many factors, including the postal zip code, internal data, rules, filters, mathematical calculations, artificial intelligence and external data that pertains to the postal zip code. The external data is taken from other databases and/or provided by suppliers of goods and services that are relevant to the lifestyle choices and the actions selected by the planner relating thereto.

Planner 40 in FIG. 1 and the combination of planners 120 and 180 in FIG. 2 also will select from the set of actions listed in message, selection and input box 330 one option that the planner considers to be most consistent with the current and probable future financial circumstances and is most likely to allow the user to purchase or otherwise acquire what the user desires in achieving its preferred lifestyle choices. The planner being used can identify its preferred selection in a variety of suitable ways, including by parking a visible icon adjacent to the mathematically optimum action derived from all of the basic data the user entered earlier, the user's answers to the questions the user entered earlier, and applicable external data taken from other databases. The planner being used will also apply artificial intelligence techniques to derive additional facts from the basic, internal and external data, and to actions used by previous users in order to accomplish their financial objectives.

With the planner 40 in FIG. 1, or the combination of planners 120 and 180 in FIG. 2, in decision box 340 the user decides if he or she wants to accept or reject the action the planner selected as being best for user. If the user decides to reject the action the planner selected, then, as depicted by message, selection and input box 342, the user can manually override the selection and choose any other action, including the user typing in his or her own action. If the user types in his or her own action, each planner will use filters, rules, artificial intelligence, natural programming and mathematical calculations to predict the action the user is asking for and verify its findings with the user before using the action. The planner stores the actions in knowledge database 44 in FIG. 1 or in knowledge database 184 in FIG. 2 depending on the planner being used.

For the planner 40 in FIG. 1 and for the combination of planners 120 and 180 in FIG. 2, message, selection and input box 350 allows the user to view his or her probable future financial circumstances and the mathematical probability of obtaining such results regardless of whether the user accepts the action the planner selected, rejects that action and chooses another action in the set, or types in an alternative action. Each time the planner or the user selects or types in a different action, the planner changes the user's financial picture and displays the recalculated bottom-line financials in message, selection and input box 350. Therefore, by selecting different menu and submenu items and/or actions in message, selection and input boxes 320 and 330 while viewing the bottom-line financials in box 350, the user can engage in "What-if?" analysis with any and all subjects that affect the user's financial life.

With the planner 40 in FIG. 1, and with the combination of planners 120 and 180 in FIG. 2, in decision box 360 the user has the opportunity to view a worksheet with the cost of each line item that makes up the total cost of a given individual action. Each planner mathematically calculates such costs based on many factors, including the postal zip code and external data from suppliers of pertinent goods and services that pertain to the postal zip code. The external data is taken from other databases and/or provided by suppliers of relevant goods and services. If the user chooses not to see those details, the user will enter decision box 370. From decision box 370 the user decides if he or she wants to continue with "What-if?" analysis with the financial consequences of various actions.

If in decision box 360 the user chooses to view the line-item costs associated with a given individual action, the planner being used will move to message, selection and input box 362. Box 362 is a worksheet with the line-item costs associated with a given individual action as estimated by the planner 40 in FIG. 1, or with the combination of planners 120 and 180 in FIG. 2.

With the planner 40 in FIG. 1 and with the combination of planners 120 and 180 in FIG. 2, in decision box 364 the user can decide to retain the cost for each line item as estimated by the planner for a given individual action as shown in box 362, or the user can override any and all of the line-item estimates with the user's own estimates, or the user can exclude one or more of the line-item costs altogether. If the user chooses to override or exclude certain line-item costs then the user would do so in message, selection and input box 366 and then the planner being used would move to message box 368 to review the user's bottom-line financials as calculated by the planner. In decision box 364 the user can decide to retain the revised estimates the user entered in message, selection and input box 366, override the estimates with new estimates, or exclude one or more of the costs altogether.

If the user elects to use the revised cost estimates, then the planner 40 in FIG. 1, or the combination of planners 120 and 180 in FIG. 2, will move to decision box 370 where the user can decide if he or she wants to continue with "What-if?" analysis. If the user decides to continue to engage in "What-if?" analysis, then each planner moves to decision box 380 where the user selects another action from the action option set in message, selection and input box 330 or select a new menu item in message, selection and input box 320.

If in decision box 370 the user decides not to continue to engage in "What-if?" analysis, the user will return to FIG. 3 where the user will have the opportunity to go to message, selection and input boxes 270, 280 and 290.

FIGS. 3 and 4 assume that the user is using an ordinary computer system and Internet connection, and accessing the planner 180 in FIG. 2 and accessing external data 130 in FIG. 2 via the Internet by calling up a particular web site and entering the user's password. In turn, the planner 120 in FIG. 2, located at the server end of the Internet, is continually using external data that applies to the user, calculating the bottom-line financials and mathematical probabilities when the user clicks the computer mouse on an "Update" button, continually deciding which advertisements should appear if the user clicks on a particular "Shop" button, and forwarding the answers and advertisements to the user via the Internet. The planner 40 in FIG. 1 and external data 60 in FIG. 1 can also be made available to users on CD/DVD, primarily for those users who do not have a connection to the Internet.

Additionally, the main program in the planner 40 in FIG. 1, or the main program in the combination of planners 120 and 180 in FIG. 2, will review the user's decisions regarding actions, financial budget, and lifestyle related choices for errors and consistency with best financial practices. If the main program detects errors or inconsistencies, educational information will be offered and made available to the user either from information stored in the computer system, the Internet, other external data sources, or live consultation with experts.

FIG. 3 depicts the process flow that takes place in the planner 40 in FIG. 1 and in the combination of planners 120 and 180 in FIG. 2.

The actions prepared in accordance with the rules of box 244 or box 250 in FIG. 3 are available to the user for engaging in "What-if?" analysis, i.e., determining the financial consequences of changing any of the various factors associated with the user's actions or lifestyle including its financial circumstances. The process for engaging in "What-if" analysis is set out in the flow diagram of FIG. 4 and is described above.

If the user decides to enter the "What-if" loop of FIG. 4 in respect of a action, he or she does so by selecting or de-selecting specific actions included the planner 40 in FIG. 1 or included in the combination of planners 120 and 180 in FIG. 2 for further analysis.

The user starts the "What-if?" analysis by viewing the "bottom-line results" in message, selection and input box 300 in FIG. 4. The bottom-line results represent the user's financials and the mathematical probabilities of attaining those results. The planner mathematically calculated the bottom-line financials and mathematical probabilities by using the user-entered given data, experience-based data contained in the memory of the planner 40 in FIG. 1, or in the memory of the combination of planners 120 and 180 in FIG. 2, that which the planner collected from other prior users, external data that pertains to the user's life stage and his or her lifestyle choices and financial circumstances taken from the knowledge database, other databases and/or provided by suppliers of relevant goods and services, and factors that the artificial intelligence, filters and rules contained in the planner derive from the given facts, basic and external data using artificial intelligence techniques.

After viewing the results, the user may decide to engage in "What-if?" analysis with his or her financials, as represented by decision box 310 in FIG. 4.

If in decision box 310 of FIG. 4 the user decides not to engage in "What-if?" analysis, the user will go back to FIG. 3 and have the opportunity to go to boxes 270, 280 and 290.

If in decision box 310 of FIG. 4 the user decides to engage in "What-if?" analysis, the user enters box 320 of FIG. 4, where the user initiates the "What if?" analysis by selecting a menu or submenu item. In box 330 a set of actions, typically made up of three to eight options, is attached to each menu and/or submenu item in box 320. For example, the set of actions attached to a submenu or menu item entitled "Furnishings" may be "I want inexpensive used furniture", "Second-hand high quality furniture is fine with me" or "I want new exclusive top-of-the-line furniture". One of the options in the set allows the user to type in his or her own action, in which case the planner 40 in FIG. 1, or the combination of planners 120 and 180 in FIG. 2, will use artificial intelligence such as a rules or inference engine, natural programming and mathematical calculations to infer an action for the user and verify the proposed action with the user before providing the action to the user. The planner being used stores the actions selected in message, selection and input box 330 in FIG. 4, in knowledge database 44 in FIG. 1 or in knowledge database 184 in FIG. 2 depending upon which planner is being used.

The menus and submenus items that are available when using message, selection and input box 320 and each set of actions that is attached to each menu and submenu item in message, selection and input box 330 allow the user to engage in "What-if?" analysis with any and all subjects that affect the user's financial life. If in decision box 240 in FIG. 3 the user decided to ignore all financially oriented scenarios, i.e., preferred lifestyle choices, then every menu and submenu item and every action in the planner 40 in FIG. 1 or in the planner made up of planners 120 and 180 in FIG. 2 will be available to the user for viewing and/or engaging in "What-if?" analysis with his or her financial circumstances.

If in decision box 240 in FIG. 3 the user decides not to ignore all scenarios relating to preferred lifestyle choices, then the planner 40 in FIG. 1 and the combination of planners 120 and 180 in FIG. 2 will make available for viewing and engaging in "What-if?" analysis menu and submenu items in message, selection and input box 320 and actions in message, selection and input box 330 that correspond to the choices selected or typed in message, selection and input box 242. The planner being used also shows to the user an estimated cost of implementation for each action, and the planner bases that estimate on many factors, including the postal zip code and external data relating to material and service costs that pertains to the postal zip code. The external data is taken from other databases and/or provided on the Internet or elsewhere by suppliers of goods and services relevant to the implementation of the actions.

Planner 40 in FIG. 1 and the combination of planners 120 and 180 in FIG. 2 also select from the given set of actions contained in message, selection and input box 330 the one option that it considers to be most consistent with the user's current and probable preferred lifestyle and future financial circumstances and will most likely allow the user to purchase or otherwise acquire what the user desires consistent with achieving the user's preferred lifestyle choices and inferences.

Planner 40 in FIG. 1 and the combination of planners 120 and 180 in FIG. 2 also identify the best option in a variety of suitable ways, including by parking a visible computer graphic or icon adjacent to such action. The planner being used selects the best choice using the basic data in the knowledge database 44 or 184 that the user entered earlier, the user's answers to previous questions in previous screens, and applicable external data taken from other internal or external databases. The planner being used also applies artificial intelligence techniques such as a rule or inference engine to derive additional conclusions and facts from the given facts, basic and external data, and to relevant actions selected by previous users of the planner to accomplish the user's financial objectives.

With the planner 40 in FIG. 1, or with the combination of planners 120 and 180 in FIG. 2, in decision box 340 in FIG. 4 the user decides to accept or reject the action that the planner has selected as the best option. If the user decides to reject the action that the planner selected, then, as depicted by message, selection and input box 342 in FIG. 4, the user can manually override the selection and choose another action, including the user typing in his or her own action. If the user types in his own action, each planner will use artificial intelligence, natural programming and mathematical calculations to predict the action the user is asking for and verify its findings with the user before using the action. The planner stores the actions selected in knowledge database 44 in FIG. 1 or knowledge database 184 of FIG. 2 as appropriate, depending on the planner being used.

For the planner 40 in FIG. 1 and for the combination of planners 120 and 180 in FIG. 2, message, selection and input box 350 in FIG. 4 depicts the user viewing his or her bottom-line financial results, i.e., the probable future financial circumstances, and the mathematical probability of obtaining those financials no matter whether the user selects or rejects the action presented by the planner or chooses another action in the set, or if the user types in an action. Each time the planner or the user selects or types in a different action, the planner changes the user's financial picture and displays the bottom-line financials in message, selection and input box 350. Therefore, by selecting different menus and submenus items and/or actions while viewing his or her bottom-line financials, the user can engage in "What-if?" analysis with any and all subjects that affect the user's financial circumstances.

With the planner 40 in FIG. 1 and with the combination of planners 120 and 180 in FIG. 2, in decision box 360 in FIG. 4 the user has the opportunity to view a worksheet with the cost of each line item that makes up the total cost of a given individual action. The planner being used will mathematically calculate such costs based on many factors, including the user's postal zip code from the knowledge database and external data that pertains to the postal zip code. The external data is taken from other internal or external databases and/or provided by suppliers of relevant goods and services. If the user chooses not to see those details, the user will enter decision box 370 in FIG. 4. From decision box 370 the user decides if he or she wants to continue with "What-if?" analysis.

If, in message, selection and input box 360 in FIG. 4, the user chooses to view the line-item costs associated with a given individual action, the user will enter message, selection and input box 362 in FIG. 4. Message, selection and input box 362 will provide the user with a worksheet with the line-item costs associated with a given individual action as estimated by the planner 40 in FIG. 1, or by the combination of planners 120 and 180 in FIG. 2.

With the planner 40 in FIG. 1, or with the combination of planners 120 and 180 in FIG. 2, in decision and input box 364 in FIG. 4 the user can decide to retain the cost for each line item as estimated by the planner for a given individual action, or the user can override any and all of the line-item estimates with the user's own estimates, or the user can exclude one or more of the line-item costs altogether. If the user chooses to override or exclude certain line-item costs then the user would do so in message, selection and input box 366 and then move to message, selection and input box 368 to review the bottom-line financials as calculated by the planner. In decision and input box 364 the user can decide to retain the revised estimates the user entered in message, selection and input box 366, override the estimates with new estimates, or exclude one or more of the costs altogether.

If the user decides to use the latest cost estimates, the user enters decision box 370 in FIG. 4 where the user decides if he or she wants to continue with "What-if?" analysis. If the user decides to continue to engage in "What-if?" analysis, then the user enters decision box 380 in FIG. 4 where the user decides to select another action from the action option set in box message, selection and input box 330 or select a new menu item in message, selection and input box 320.

If in decision box 370 in FIG. 4 the user decides not to continue to engage in "What-if?" analysis, the user will return to FIG. 3 where the user will have the opportunity to go to message, selection and input boxes 270, 280 and 290.

Description of Operation:

As described above, the planner 40 in FIG. 1 and the combination of planners 120 and 180 in FIG. 2 relate to a software-driven computerized method for creating and implementing a comprehensive financial plan of action and a financial budget for achieving lifestyle choices for a user. The plan of action allows an individual to execute separate and distinct financial actions and transactions consistent with the user's lifestyle choices, financial circumstances and objectives.

The method of the present invention comprises:

a) collecting and storing facts about the user's stage of life;

b) collecting and storing facts about the user's geographic location and current financial circumstances;

c) collecting and storing facts about the user's current lifestyle and current financial objectives;

d) collecting and storing facts about the user's preferred lifestyle, future financial objectives and potential life-changing events;

e) using the facts collected and stored related to the user's stage of life and his or her geographic location, current financial circumstances, current lifestyle, current financial objectives, preferred lifestyle, future financial objectives and potential life-changing events to determine and draw inferences about the current financial circumstances, current lifestyle, current financial objectives, preferred lifestyle, future financial objectives and potential life-changing events;

f) providing the user, by displaying and/or printing, with a listing of the user's stage of life and inferred geographic location and current financial circumstances, current lifestyle, current financial objectives, preferred lifestyle, future financial objectives and potential life-changing events;

g) allowing the user to revise his or her stage of life and his or her geographic location, current financial circumstances, current lifestyle, current financial objectives, preferred lifestyle, future financial objectives and potential life-changing events;

h) collecting and storing additional and/or revised data that is related to the user's revisions to the user's stage of life and to his or her geographic location, current financial circumstances, current lifestyle, current financial objectives, preferred lifestyle, future financial objectives and potential life-changing events;

i) using the additional and/or revised data related to the user's revisions to draw inferences related to the user's stage of life and to his or her geographic location, current financial circumstances, current lifestyle, current financial objectives, preferred lifestyle, future financial objectives and potential life-changing events;

j) collecting, storing and presenting to the user, by displaying and/or printing, a customized network of menus and submenus that categorize and organize the individual actions that the invention determines the user must take to achieve the user's current financial objectives, preferred lifestyle and future financial objectives, given the user's stage of life and his or her geographic location, current financial circumstances, current lifestyle and potential life-changing events;

k) allowing the user to revise the individual actions presented to the user via the customized network of menus and submenus by playing "What-If? with the individual actions for the purpose of obtaining the user's preference of individual actions that the user wants to take to achieve the current financial objectives, preferred lifestyle and future financial objectives, given the user's stage of life and his or her geographic location, current financial circumstances, current lifestyle and potential life-changing events;

l) using the combination of individual actions revised by the user and the individual actions not revised by the user to draw inferences about the individual actions the user must take to achieve the current financial objectives, preferred lifestyle and future financial objectives, given the user's stage of life and his or her geographic location, current financial circumstances, current lifestyle and potential life-changing events;

m) using the stored and inferred individual actions to create revised individual actions and a financial plan of action that allows the user to see all of the actions the user must take either now or in the future to acquire goods and services that coincide with the geographic location, current lifestyle and financial circumstances and objectives, preferred lifestyle and potential life-changing events, and probable future financial circumstances and objectives;

n) creating the user's financial budget that allows the user to coordinate its monthly spending with the financial plan of action the invention created;

o) presenting to the user, by displaying and/or printing, a customized network of menus and submenus that categorizes and organizes the individual actions and holds the financial plan of action and financial budget the invention created for the user;

p) allowing the user to revise his or her individual actions, financial plan of action and financial budget;

q) using the combination of individual actions, financial plan of action and financial budget revised by the user and the individual actions, financial plan of action and financial budget not revised by the user to draw inferences about the individual actions the user must take to achieve the current financial objectives, preferred lifestyle and future financial objectives, given the user's stage of life and his or her geographic location, current financial circumstances, current lifestyle and potential life-changing events;

r) revising the menus, submenus, individual actions, financial plan of action and financial budget based on stored and inferred data to coincide with the individual actions the user must take to achieve the current financial objectives, preferred lifestyle and future financial objectives, given the user's stage of life and his or her geographic location, current financial circumstances, current lifestyle and potential life-changing events s) presenting to the user, by displaying and/or printing, the revised customized network that consists of revised menus, submenus and individual actions and holds the revised financial plan of action and revised financial budget the invention created for the user;

t) calculating and presenting to the user, by displaying and/or printing, the anticipated financial results of implementing a given individual action, a given combination of individual actions or the financial plan of action while considering the geographic location, current lifestyle and financial circumstances and objectives, preferred lifestyle and potential life-changing events, and probable future financial circumstances and objectives;

u) calculating and presenting to the user, by displaying and/or printing, the mathematical probability of achieving a given individual action, a given combination of individual actions or the financial plan of action while considering the geographic location, current lifestyle and financial circumstances and objectives, preferred lifestyle and potential life-changing events, and probable future financial circumstances and objectives;

v) identifying solutions to errors, omissions and potential problems with an individual action, a combination of individual actions or the financial plan of action while considering the geographic location, current lifestyle and financial circumstances and objectives, preferred lifestyle and potential life-changing events, and probable future financial circumstances and objectives, and presenting those solutions to the user by way of computer simulation techniques, computer audio and/or video techniques, and/or human contact via video conferencing, telephone, and/or live instant messaging, chat room and/or other suitable techniques;

w) offering general financial education and guidance from financial experts that relates to the individual actions, a combination of individual actions and/or financial plan of action using computer simulation techniques, computer audio and/or video techniques, and/or human contact via video conferencing, telephone, and/or live instant messaging, chat room and/or other suitable techniques;

x) creating and presenting to the user, by displaying and/or printing, charts and graphs that capture the user's individual actions, combinations of individual actions, the financial plan of action and/or the financial budget; and y) selecting and displaying advertisements that allow the user to shop for goods and services that coincide with the geographic location and the financial plan of action and monthly financial budget the invention created for the user and (i) displaying those advertisements only after the user indicates to the invention that he or she wants to see those advertisements, and (ii) allowing the user to contact those vendors via face-to-face contact, Internet hyperlinks and email, telephone, facsimile, letter, video conference, and/or other suitable techniques.

Planner 40 in FIG. 1 and the combination of planners 120 and 180 in FIG. 2 include main program software for generating monitor screens containing questions and allowing user inputs and include an auxiliary artificial intelligence program working in cooperation with the main program and that includes software rules, filters and artificial intelligence including rules and inference engines for deriving inferences regarding his or her preferred lifestyle and personalizing the actions in accordance with the preferred lifestyle, current and probable future financial circumstances, and financial objectives.

The rules and inference engines may use game theory or other artificial intelligence concepts to derive inferences from the given facts, imported data, and other inputs from a user.

The logic and logic flow required for collecting and analyzing user input data, deriving facts therefrom, and generating general and specific actions and reports are described in greater detail below.

Planner 40 in FIG. 1 and the combination of planners 120 and 180 in FIG. 2 use artificial intelligence including rules and inference engines to apply certain rules for interpreting facts collected from a user and deriving additional information concerning the user's stage of life and his or her lifestyle, financial circumstances and for developing financial actions for accomplishing the financial objectives.

The Wikipedia encyclopedia on the worldwide web defines Artificial intelligence (AI) as "intelligence exhibited by an artificial entity."

The Wikipedia encyclopedia defines rules engines and inference engines as

"the software components that separate the business rules from the application code. An inference engine derives answers from a knowledge base. It is the brain of the expert systems that provides a methodology for reasoning about the information in the knowledge base, and for formulating conclusions based on that information.

An inference engine has three main elements. They are:
1. An interpreter. The interpreter executes the chosen agenda items by applying the corresponding base rules.
2. A scheduler. The scheduler maintains control over the agenda by estimating the effects of applying inference rules in light of item priorities or other criteria on the agenda.
3. A consistency enforcer. The consistency enforcer attempts to maintain a consistent representation of the emerging solution.

The Wikipedia encyclopedia describes a knowledge database as

"a special kind of database for knowledge management. It provides the means for computerized collection, organization, and retrieval of knowledge. Knowledge bases are used to capture explicit knowledge of and about an organization or individual. The purpose of a knowledge base is to provide a means to discover solutions to problems that have already been solved."

Basically, the planner 40 in FIG. 1 and the combination of planners 120 and 180 in FIG. 2 operate on user provided facts ("the given facts") to personalize the knowledge database and categorize each user's stage of life and his or her lifestyle. The possibilities for lifestyle range from "extremely frugal" to "lavish without limits". As described herein, the techniques used to determine and classify a lifestyle can range from straightforward but revealing psychological questions about risk tolerance and lifestyle choices that the user has made and plans to make together with relatively simple "if-then" logic statements and text filters and rules to more complex artificial intelligence concepts such as inference engines using techniques such as game theory.

Selections and data entries made by the user are filtered against the rules and subjected to artificial intelligence logic to derive the appropriate classification of his or her lifestyle.

The given facts and information derived and inferred for the user in respect of lifestyle are used to obtain relevant external data, ask further questions about the user's lifestyle choices, and present the user with appropriate questions and choices for determining actions that are best suited to achieve his or her financial and lifestyle objectives.

The first step in the planning process is to determine the user's "stage of life" by collecting and storing data relating to the user's stage of life. The user makes selections from stage of life choices that best describe his or her current stage of life. Samples of the stages of life from which the user choose are: (i) adolescent, (ii) adult without dependents, (iii) adult with dependents, (iv) adult with dependents but the nest is emptying or is empty, and (vi) retired. The planner will not allow the user to advance to the next step of the method until one of such stage of life is selected. Entering choices in the stage of life screen is necessary for first-time users only. In the user's subsequent sessions using the planner, the choices made by the user regarding stage of life will be available in knowledge database 44 in FIG. 1 or knowledge database 184 depending upon if the planner 40 in FIG. 1 is used or the combination of planners 120 and 180 in FIG. 2 is used. Unless the user's stage of life changes, it will not be necessary for the user to select his or her the stage of life again.

The second step of the planning process is to collect and store information about the user's geographic location and current financial circumstances. The entails the user entering basic personal data such as the postal zip code, number of dependents, monthly income, monthly mortgage payment, and the dimensions of their house.

Planner 40 in FIG. 1 and the combination of planners 120 and 180 in FIG. 2 do not require highly personal data such as name, address and social security number. Also, the user need not answer all of the questions asked, but the more questions that are answered, the better the planner will be able to estimate his or her future financial circumstances in subsequent portions of the planner. The user need not enter the basic data again unless to change the basic data.

The third step of the planning process is to make a preliminary determination of the user's current lifestyle and current financial objectives. To that end, the user provides answers to a set of questions that relate to the current lifestyle and current financial objectives. The questions are provided by software and are designed to allow the user to reveal his or her current lifestyle and current financial objectives.

Typical examples of lifestyle questions are "Do you prefer to buy new or used furniture? "At what age would you like to retire?", "Is the style of your mailbox important to you?", "Would you rather watch an opera or a baseball game?", "Do you like to watch movies?", "Do you need or want to have a cell phone with you?", "Do you need or want to have land-line phone service in your house?", "Do you own an RV?" and "Do you enjoy traveling?"

Such questions are intended to evoke answers that allow the planner 40 in FIG. 1 and the combination of planners 120 and 180 in FIG. 2, to apply artificial intelligence techniques to determine whether the user lives and plans to live frugally, lavishly or somewhere in between. As with the second step of the planning process, it is not necessary that the user answers all of the questions presented about current lifestyle and current financial objectives. However the more questions the user answers about his or her current lifestyle and current financial objectives, the better the planner will be able to select and report actions for the user to follow in pursuit of the preferred lifestyle. The user needs to provide current lifestyle and current financial objectives data only once, unless to change an answer to a question, or unless the user made a change in his or her stage of life or a change in its current financial circumstances that causes the planner to revise the questions that it presents to the user in regard to the current lifestyle or current financial objectives.

The fourth step of the planning process is related to the identification of the user's preferred lifestyle, future financial objectives and potential life-changing events. In this step, the user can view a list of preferred lifestyle choices, future financial objectives and potential life-changing events that he or she may want to consider in planning a preferred lifestyle. Planner 40 in FIG. 1 and the combination of planners 120 and 180 in FIG. 2 use filters, rules, mathematical calculations, and inference engines and other artificial intelligence to customize the various alternative lifestyles and potential life-changing events based on the answers the user provides in the previous three steps and uses internal and external data that is relevant to user's stage of life and the geographic location, current financial circumstances, current lifestyle, current financial objectives and current lifestyle choices the user identified. When taken together, the preferred lifestyle, future financial objectives and potential life-changing events, or any combination of such choices, objectives and events, make up a specific situation that the user may want to examine from a financial standpoint. Some examples of such preferred lifestyle choices, future financial objectives and life-changing events, if occurring within the foreseeable future, are: "My income will increase.", "My income will decrease.", "I will be retiring.", "I will be having a biological child.", "I will adopt a child.", "One or more of my children will leave home." and "I will buy or sell an RV."

The user has the option of (i) ignoring the list of preferred lifestyle choices, future financial objectives and potential life-changing events presented by the planner 40 in FIG. 1 or the combination of planners 120 and 180 in FIG. 2, or (ii) selecting only those preferred lifestyle choices, future financial objectives and potential life-changing events that apply and/or (iii) typing in other preferred lifestyle choices, future financial objectives and potential life-changing events. If the user types in an ad hoc lifestyle, objective or life-changing event, the planner will interpret the entry and predict what statement the user is making and verify the derived findings with the user before using the ad hoc choice, objective or event in a presentation to the user.

The fifth step in the planning process is the menus and actions steps. In this step, the planner 40 in FIG. 1, or the combination of planners 120 and 180 in FIG. 2, determine, collect and store menus, submenus and actions and show those menus, submenus and actions to the user that correspond to the user's current financial circumstances, current and preferred lifestyles and anticipated life-changing events. The menus, submenus and actions shown to the user allow the user to select a given individual action and/or engage in "What-if?" analysis with any and all subjects that affect his or her lifestyle and financial life in accordance with the process flow of FIGS. 3 and 4. An example of a menu is "Housing" which carries submenus such as "Additions", "Decorating" and "Landscaping". Examples of actions that correspond to the submenu "Landscaping" include "I only want to add bushes and trees, and do it all myself" and "I want to hire a professional landscape architect to do a complete landscaping job". Each menu and/or submenu usually has three to eight actions that relate to the menu and/or submenu.

If, in the fourth step of identifying the preferred lifestyle and potential life-changing events, the user decided to ignore the list of planner-driven possibilities, then in the fifth step, the menus and actions step, the user will have access to every menu, submenu and action that is available in the planner 40 in FIG. 1 or in the combination of planners 120 and 180 in FIG. 2. If in the fourth step the user decided to select those possibilities that apply to a current or preferred situation the user wants to explore, then in the fifth step the user will have access to only those menus, submenus and actions that pertain to the scenarios that the user selected regarding his or her preferred lifestyle or potential life-changing events. For example, if in the fourth step the user selected the possibility of "One or more of our parents may become dependent on us", then, in the fifth step the user will have access toga menu "Adult Care" and its corresponding submenus and actions. If in the fourth step the user typed in an ad hoc possibility, then the planner will highlight those menus, submenus and actions that pertain to that ad hoc possibility.

When working in the fifth step, the menus and actions step, the user sees his or her "bottom-line financials" such as projected savings together with the mathematical probabilities of attaining such financial results. The planner 40 in FIG. 1, or the combination of planners 120 and 180 in FIG. 2, mathematically calculated the bottom-line financial results and mathematical probabilities by using the data the user entered previously and other factors relevant to the financial circumstances and stored in knowledge database 44 and 184 and external data 60 and 130.

As stated, the planner 40 in FIG. 1 and the combination of planners 120 and 180 in FIG. 2 also allow the user to determine the effects a changing life stage, lifestyle and financial circumstances, or a combination of a changing life stage, lifestyle and financial circumstances, would have on the user's bottom-line financials. To that end, the user would enter the "What-if?" loop of FIG. 4. To initiate that "What if?" analysis for this purpose, in the fifth step the user would select the menu, select the submenu and then select the action the user wants to explore. For example, regarding furniture, the user would select "Housing" and then select the submenu "Furniture" and then select one choice from a from a list of actions such as: "I want my new furniture to be as simple as bean bags and bubble furniture", "I want new unfinished furniture", "I want new inexpensive furniture", "I want new quality furniture", "I want new exclusive top-of-the-line furniture", "I want inexpensive used furniture", "I want quality used furniture" and "I want quality antique furniture". Based upon the data the user entered previously and other factors relevant to the user's financial circumstances and stored in knowledge database 44 and 184 and external data 60 and 130, the planner will pre-select the best action for the user and identify that selection in a variety of suitable ways including by parking a visible icon next to that action.

If in the third step, making a preliminary determination of the user's current lifestyle, the user indicated that he or she prefers to buy new furniture, then, in the fifth step, the menus and actions step, the filters, rules, mathematical calculations and artificial intelligence contained in the planner 40 in FIG. 1 and in the combination of planners 120 and 180 in FIG. 2 will cause the planner to select one, and only one, of the five "new furniture" actions; the planner will not choose any of the three "used furniture" actions. In the fifth step the user can accept or reject the planner's suggested choice. To accept the planner's selection, the user need not do anything. To reject the planner's selection, the user can select another action from the list of actions by simply selecting another action in the list or by typing in his or her ad hoc action. If the user types in an ad hoc action, the inference engine of the planner 40 in FIG. 1, or the combination of planners 120 and 180 in FIG. 2, will derive the action the user desires and verify its findings with the user before fixing on that action.

To help the user decide on which action in the list he or she wants to select, in the fifth step, the menus and actions step, the planner 40 in FIG. 1 and the combination of planners 120 and 180 in FIG. 2 will show cost estimates for each action in the list. The planner mathematically calculates such costs using as much real cost data as possible obtained from external sources such as the Internet or the CD/DVD and based on many factors, including the user's postal zip code. Further, by selecting a given individual action, the planner will provide the user with a worksheet that shows every line item of such action, and the cost of every line item, that the planner used to estimate the total cost of that particular action. Examples of line items found on a "quality furniture" worksheet may be "Queen size headboard: $500" and "Night Stand: $350." Such prices would be obtained from dealers of quality furniture in the user's locality from information provided on the Internet, CD/DVD or other computer accessible source. In the worksheet, the user can retain the planner's estimated cost of each line item, or the user can replace the planner's cost estimate of any line item with the user's own cost estimate which the planner will then accept and use in the cost of the action, or the user can exclude one or more of the line items altogether.

Whether the user accepts or rejects the action in the menus and actions step that the planner 40 in FIG. 1 or the combination of planners 120 and 180 in FIG. 2 selected, or the user changes the cost of a line item in a worksheet, or the user eliminates one or more line items in a worksheet, the planner will recalculate and display the user's bottom-line financials and the mathematical probability of obtaining those financials each time the user requests such a recalculation. The user can request a recalculation by selecting an "Update" button found throughout the planner 40 in FIG. 1, or throughout the combination of planners 120 and 180 in FIG. 2.

When recalculating the user's bottom-line financials and mathematical probabilities, the planner 40 in FIG. 1 and the combination of planners 120 and 180 in FIG. 2 will take into account all of the actions the planner or the user selected from all of the other menus and submenus found in the menus and actions step and the cost of all of the line items in all of the worksheets that were estimated by the planner or by the user. Therefore by (i) selecting different menus, submenus and/or actions in the menus and actions step, and/or (ii) revising the cost of line items in the worksheets, and/or (iii) eliminating line items in the worksheets, and (iv) periodically recalculating their bottom-line financials and mathematical probabilities by selecting an "Update" button, the user can engage in "What-if?" analysis with any and all subjects that affect the user's financial life—until, ultimately, the user will have a comprehensive "financial plan of action" for his or her that is acceptable. Since the planner 40 in FIG. 1, or the combination of planners 120 and 180 in FIG. 2, customized the financial plan of action for the user by including every action in the menus and actions step that was selected by the planner or by the user and by including every line item in the worksheets that was selected by the planner or by the user, by implementing that financial plan of action, the user can acquire the goods and services it desires consistent with the user's current and future financial objectives.

For instance, in the menus and actions step, if the user chooses the "exclusive, top-of-the-line furniture" action rather than stay with the furniture action that the planner 40 in FIG. 1 or the combination of planners 120 and 180 in FIG. 2 chose for the user, the planner may notify the user that if exclusive, top-of-the-line furniture is purchased and there is no change to any of the other actions or the cost of any action via a worksheet, then there is a 50% chance that the user will be $9,000 in debt after three years. If the user finds that scenario to be unsatisfactory, but the user still wants to buy exclusive top-of-the-line furniture, then other options can be explored which may be accomplished by making other adjustments. For example, assume that the user eliminates some of the pieces of the furniture via the worksheet for the exclusive top-of-the-line furniture; and after the user selects the Update button, the planner estimates that there is a 60% chance that the user will be $6,500 in debt after three years. Further assuming that, in an effort to reduce that $6,500 debt, under two other menus in the menus and actions step, the user (i) chooses an action that calls for the user keeping its automobile until it has 60,000 miles instead of a 40,000-mile assumption the planner used in its calculations, and (ii) chooses an action that says the user is willing to reduce its monthly savings by 10%. Now, when the user selects "Update", the planner uses filters, rules, mathematical calculations and artificial intelligence to estimate that there is a 70% chance that the user will be $1,000 in debt after three years. In that fashion, the user can continue to engage in "What-if?" analysis until he or she is satisfied with the planner's estimate of his or her bottom-line financials and associated mathematical probabilities if top-of-the-line furniture is purchased, and is satisfied that the action is consistent with his or her lifestyle choices while maintaining the ability to achieve the other financial objectives.

At any time, the user can view and/or print his or her financial plan of action. In that way, the user can see—in one document—all of the actions that he or she must take now and in the future to achieve the financial results the planner 40 in FIG. 1, or the combination of planners 120 and 180 in FIG. 2, predict.

Planner 40 in FIG. 1 and the combination of planners 120 and 180 in FIG. 2 include a Shop option which is located next to each action in the financial plan of action. If the user selects Shop, the planner will present the user with advertisements from local, regional and national vendors that sell products or services that pertain to the action of interest.

Staying with the above furniture example, once the user instructs the planner 40 in FIG. 1, or the combination of planners 120 and 180 in FIG. 2, that exclusive top-of-the-line furniture will be purchased, the user selecting the Shop button next to the "furniture" action in the financial plan of action will cause the planner to display advertisements from vendors that sell exclusive top-of-the-line furniture. In the case of furniture, most of the advertisements will use the zip code or other information entered by the user to identify vendors in close proximity to the user's geographic location.

Other more remote vendors can be accessed if desired. The user can then contact one or more of such vendors by meeting with the vendors face-to-face or by using a hyperlink to the vendor's web site directly from the vendor's advertisement, having the planner e-mail the vendor, having the planner contact the vendor by telephone, having the planner fax a message to the vendor, having the planner write a letter to the vendor, or having the planner set up a telephone or video conference with the vendor. In other words, the planner 40 in FIG. 1 and the combination of planners 120 and 180 in FIG. 2 assist the user in shopping for and purchasing the product or service the user wants to purchase in furtherance of the user's pursuit of its financial plan of action and financial budget.

Further, since the advertisements coincide with the user's desires, financial circumstances and geographic location, the user can easily shop for products and services that coincide with the user's specific financial plan of action; and do so in less time than it would take the user if the planner 40 in FIG. 1, or the combination of planners 120 and 180 in FIG. 2, did not filter vendors and select only vendors whose products and/or services coincide with the financial plan of action.

The invention also provides for the possibility of "target advertising" for those vendors who choose to advertise on the planner 40 in FIG. 1, or on the combination of planners 120 and 180 in FIG. 2.

At any time during the process, by selecting view or print, the user can view and/or print a monthly financial budget that coincides with the user's desires and financial circumstances. By adhering to the financial budget, the user's monthly spending will be consistent with the financial plan of action that the planner 40 in FIG. 1, or the combination of planners 120 and 180 in FIG. 2, customized for the user. Also, at any time, by making an appropriate selection, the user can view and/or print charts and graphs that illustrate the user's current and future financial circumstances and the mathematical probabilities of achieving its future financial objectives. The planner 40 in FIG. 1 and the combination of planners 120 and 180 in FIG. 2 create the user's monthly financial budget, charts and graphs by using the given facts and other data and information obtained from the user or derived by the planner and the planner used for other calculations.

The foregoing example assumes that combination of planners 120 and 180 is configured as depicted in FIG. 2. The is, the user is using an ordinary personal computer system and Internet connection and is accessing the planner and external data via the Internet by connecting to a particular web site and entering the user's password. Planner 120, which is located at the server end of the Internet, is continually using external data that applies to the user, calculating the user's bottom-line financials and mathematical probabilities when the user uses an update button, continually deciding which advertisements should appear if the user clicks on a particular Shop button, and forwarding the answers and advertisements to the user via the Internet. External data 130 in FIG. 2 consists of numerical and other data taken from other sources and databases and/or provided by suppliers of relevant goods and services.

The planner 40 and external data 60 depicted in FIG. 1 are available on CD/DVD. In this case, (i) the supplier of the planner 40 sends the user a CD/DVD that holds a password-protected copy of the planner 40 and periodically sends CD/DVDs that holds updated external data 60 that applies to the user, or (ii) the user can receive the planner 40 on a CD/DVD and the updated external data 60 via the Internet. Approaches "i" and "ii" are less convenient for both the supplier and the user than if the user accesses the planner and external data via the Internet exclusively, as depicted in FIG. 2.

With the planner 40 in FIG. 1, or the combination of planners 120 and 180 in FIG. 2, the user does not have to provide information to the planner for every question asked by the planner. However, the more data the user enters, (i) the more specific facts the planner can derive about the user, (ii) the better the planner can use filters, rules, mathematical calculations and artificial intelligence to derive inferences and select actions for the user, and (iii) the more accurately the planner can mathematically estimate the user's current and future financial circumstances.

Description of Software
    General

A user's lifestyle can usually be accurately determined by obtaining answers to a relatively few properly framed questions. This invention uses that technique to gather and derive facts about a user's lifestyle and objectives and probable future financial actions and behaviors. Examples of such questions and the operation of the software used by the planner 40 in FIG. 1, or the combination of planners 120 and 180 in FIG. 2 are mentioned above and provided below.

Basically, the invention develops and uses standard and customized question sets for the user by employing a "main program" and an "inference engine". The main program used in the planner 40 in FIG. 1 and in the combination of planners 120 and 180 in FIG. 2 is an applications program that generates various monitor screen graphics including the initial set of questions regarding life stage and other basic information required from the user, stores and retrieves applicable data to and from internal and external databases, and performs many of the mathematical calculations required by the planner to establish basic categorized facts that are used in further operation of the planner. The main program can be written in a procedural language such as C++ or other suitable programming languages. An "inference engine" applies certain rules to certain facts to conclude other facts. The inference engine can be written in PROLOG or other suitable languages. The inference engine is integrated into the main program using the same procedural language the main program is written in, or may be written in any other suitable language.

Customizing a question set for the user starts with questions designed to elicit from the user certain general and basic facts concerning the user. Those basic facts include such facts as the user's stage of life and date of birth, and his or her postal zip code, annual income, and number of dependents. The main program collects, stores in a database, and categorizes each fact by placing the fact into a range that corresponds to the value or other measurement of the fact.

The main program stores the user entered facts, which are called "given facts," in knowledge database 44 in FIG. 1 for use by the planner 40 in FIG. 1, or stores the entered facts in knowledge base 144 in FIG. 2 for use by the combination of planners 120 and 180 in FIG. 2, depending on which planner is being used.

In turn, the inference engine derives numerous other facts, called "inferences" or "derived facts," by applying forward-chaining and backward-chaining, game theory, or other artificial intelligence techniques to the given facts, external data, and to given rules and provides the planner 40 in FIG. 1, or the combination of planners 120 and 180 in FIG. 2, with those derived facts. An approach used in the planner 40 in FIG. 1, or the combination of planners 120 and 180 in FIG. 2, to derive additional facts concerning the user's lifestyle and financial circumstances from the given facts is to ask the user to provide answers to a series of questions about the user's lifestyle and financial circumstances. The questions usually become progressively narrower and provide increasingly specific insight into the user's current lifestyle and financial circumstances and objectives.

The rules used in the inference engine in the planner are based on rules such as those that result from marketing and behavioral science studies of consumer decision-making processes. When the rules and inference engine operates on the given facts to derive additional facts, the main program stores the given and derived facts in the knowledge database 44 in FIG. 1 or knowledge database 184 in FIG. 2, depending on which planner is being used. The planner being used uses some or all of those given and derived facts to customize or personalize the question sets for the user. All of the given and derived facts that the main program stores in the knowledge database 44 or 184 are available for use in other portions of the method of the planner.

Determination of Stage of Life and Current Financial Circumstances

To start the planning process, the planner 40 in FIG. 1 or the combination of planners 120 and 180 in FIG. 2 presents a given selection menu to the user from which the user can provide facts about his or herself such as his or her gender, stage of life and date of birth, and facts such as the postal zip code, annual income and number of dependents. The following table gives a sample of how the planner collects and categorizes the given facts.

| Example of selection menu shown to the user | Facts provided by user, i.e., given facts. | The inference engine then categorizes the "given facts" and stores them in the knowledge database. |
| --- | --- | --- |
| Stage of life | Retired | stage_of_life(retired) |
| Gender | Male | gender(m) |
| Postal zip code | 44136 | coli(range_h) |
| Date of birth | 01/01/1934 | age(range_d) |
| Annual income | $20,000 | income(range_b) |
| Number of dependents | 1 | num_of_dependents(range_b) |

The code shown in the table exemplifies code that can be used to collect facts about the user's stage of life and current financial circumstances. The code shown in the table results from applying well-known PROLOG language coding techniques to the facts the user entered into the planner combined with inferences drawn by the planner's inference engine prior to and during the stage of life and current financial circumstances analysis to translate the given facts into ranges. The planner then stores that data as facts in knowledge database 44 or knowledge database 184 depending upon the planner being used. The inference engine uses all of those facts to derive numerous other facts about the user by applying well-known forward-chaining and/or backward-chaining techniques to given rules such as those that result from behavioral science studies of consumer decision-making and stores all of those facts in knowledge database 44 or knowledge database 184, depending upon the planner being used.

Determination of Current Lifestyle and Current Financial Objectives

After collecting, categorizing and storing the facts relating to the user's stage of life and the user's current financial circumstances as exemplified in the table above, the planner 40 in FIG. 1 or the combination of planners 120 and 180 in FIG. 2 present the user with a set of questions relating to the user's current lifestyle and current financial objectives. The planner starts that process by determining which questions should be shown to the user.

The planner customizes the set of current lifestyle and current financial objectives questions for the user by having its inference engine operate on the facts the user entered into the planner combined with inferences drawn by the inference engine prior to and during this current lifestyle and current financial objectives analysis to draw logical inferences about the user's current lifestyle and current financial objectives and then, based on those conclusions, the planner will (i) from a finite set of current lifestyle and current financial objectives questions, delete those questions that appear to be irrelevant to the user's plan of action; (ii) answer those questions for which its inference engine can derive answers; (iii) ask the user to provide answers to the questions that remain in the finite set of current lifestyle and current financial objectives questions; and (iv) reinstate in the set of finite current lifestyle and current financial objectives questions those questions the inference engine determines it deleted earlier but, based on new facts, are relevant to the user. In that fashion, the user can provide information to the planner about his or her current lifestyle and current financial objectives without the user having to consider current lifestyle and current financial objectives questions that are not pertinent to the user's plan of action. The planner retrieves the information it needs from knowledge database 44 of FIG. 1 or knowledge database 184 of FIG. 2, depending on which planner is being used.

The planner stores the user's answers to the questions relating to current lifestyle and current financial objectives in knowledge database 44 in FIG. 44 or knowledge database 184 in FIG. 2, depending on which planner is being used. The answers are stored in the form of facts and are available for later use by the planner. In addition to storing those answers in the form of facts in knowledge database 44 or knowledge database 184, the planner also stores other facts and inferences that are available for later use by the planner.

The code shown below is a example of code that can be used to collect the user's current lifestyle and current financial objectives facts. The code shown below results from applying well-known PROLOG language coding techniques in the planner's inference engine to the facts the user entered into the planner combined with inferences drawn by the inference engine prior to and during a current lifestyle and current financial objectives analysis. The inference engine stores such facts and the facts that drive such facts in knowledge database 44 or knowledge database 184 depending upon the planner being used. The inference engine uses all of those facts to derive numerous other facts about the user by applying well-known forward-chaining and/or backward-chaining techniques to given rules such as those that result from behavioral science studies of consumer decision-making.

Current Lifestyle facts that are marked with "*" are facts derived from the current lifestyle PROLOG code that direct the main program in the planner 40 in FIG. 1, or in the combination of planners 120 and 180 in FIG. 2, to show or not to show the corresponding current lifestyle and current financial objective question to the user. The current lifestyle facts marked with "*" represent facts the planner's inference engine derived directly from the given facts the user provided to the planner.

Current Lifestyle facts that are marked with "prelim" are facts derived from the current lifestyle PROLOG code that indicate the planner's preliminary answer to the corresponding current lifestyle and current financial objective question. The facts marked with "prelim" represent facts the planner's inference engine derived directly from the given facts entered by the user in combination with inferences drawn by the inference engine prior to and during a current lifestyle and current financial objectives analysis. The planner shows the preliminary answer to the user only if the question is included in knowledge database 44 or knowledge database 184, depending on which planner is being used, and the planner was not able to answer the question directly from the given facts the user provided to the planner.

The user is allowed to change any answer to any current lifestyle and current financial objective question the planner shows to the user. If the user changes an answer, the main program in the planner will replace the corresponding current lifestyle and current financial objectives fact with the current lifestyle and current financial objective fact that corresponds to the user's input.

Do you like to watch movies?
Current Lifestyle_fact(likes_movies) prelim
Current Lifestyle_fact(does_not_like_movies)
Do you need or want to have a cell phone with you?
Current Lifestyle_fact(needs_cell)prelim Current Lifestyle_fact(does_not_need_cell)
Do you need or want to have land-line phone service in your house?
   Current Lifestyle_fact(needs_land_line_phone) prelim
   Current Lifestyle_fact(does_not_need_land_line_phone)
Do you own an RV?
   Current Lifestyle_fact(show_rv_question) ***
   Current Lifestyle_fact(do_not_show_rv_question)
   Current Lifestyle_fact(owns_rv)
      Current Lifestyle_fact(does_not_own_rv) prelim
Do you enjoy traveling?
   Current Lifestyle_fact(enjoys_traveling) prelim
   Current Lifestyle_fact(does_not_enjoy_traveling)
Do you enjoy camping?
   Current Lifestyle_fact(enjoys_camping) prelim
   Current Lifestyle_fact(does_not_enjoy_camping)

Determination of Preferred Lifestyle, Future Financial Objectives and Potential Life-changing Events After collecting, categorizing and storing the facts relating to the user's current lifestyle as exemplified above, the planner 40 in FIG. 1 or the combination of planners 120 and 180 in FIG. 2 present the user with a set of choices relating to the user's preferred lifestyle, future financial objectives and potential life-changing events. The planner starts that process by determining which preferred lifestyle choices, future financial objectives and potential life-changing events should be shown to the user.

The planner customizes the set of preferred lifestyle choices, future financial objectives and potential life-changing events for the user by having its inference engine operate on the facts the user entered into the planner combined with inferences drawn by the inference engine prior to and during this preferred lifestyle, future financial objectives and potential life-changing event analysis to draw logical inferences about the user's preferred lifestyle, future financial objectives and potential life-changing events and then, based on those conclusions, the planner will (i) from a finite set of preferred lifestyle choices, future financial objectives and potential life-changing events, delete those choices, objectives and events that appear to be irrelevant to the user's plan of financial objectives and plan of action; and (ii) reinstate in the finite set of preferred lifestyle choices, future financial objectives and potential life-changing events those choices, objectives and events that the inference engine determines it deleted earlier but, based on new facts, are relevant to the user's financial objectives and plan of action. The choices, objectives and events that remain have potential future financial consequences to the user. The user is then prompted to select or not select the choices, objectives and events that remain. In that fashion, the user can select preferred lifestyle choices, future financial objectives and potential life-changing events without the user having to consider choices, objectives and events that are not pertinent to the user. The planner retrieves the information it needs from knowledge database 44 of FIG. 1 or knowledge database 184 of FIG. 2, depending on which planner is being used.

The planner stores the user's choices, objectives and events relating to preferred lifestyle, future financial objectives and potential life-changing events in knowledge database 44 in FIG. 44 or knowledge database 184 in FIG. 2, depending on which planner is being used. The answers are stored in the form of facts and are available for later use by the planner. In addition to storing those choices, objectives and events in the form of facts in knowledge database 44 or knowledge database 184, the planner also stores other facts and inferences that are available for later use by the planner.

The code shown below is a example of code that can be used to collect the preferred lifestyle facts, future financial objectives and potential life-changing events. The code shown below results from applying well-known PROLOG language coding techniques in the planner's inference engine to the facts the user entered into the planner combined with inferences drawn by the inference engine prior to and during a preferred lifestyle, future financial objectives and potential life-changing event analysis. The inference engine stores such facts and the facts that drive such facts in knowledge database 44 or knowledge database 184 depending upon the planner being used. The inference engine uses all of those facts to derive numerous other facts about the user by applying well-known forward-chaining and/or backward-chaining techniques to given rules such as those that result from behavioral science studies of consumer decision-making.

Preferred Lifestyle facts that are marked with "*" are facts derived from the current lifestyle PROLOG code that directs the main program in the planner 40 in FIG. 1, or in the combination of planners 120 and 180 in FIG. 2, to show or not to show the corresponding preferred lifestyle choice, future financial objective or potential life-changing event to the user. The preferred lifestyle facts marked with "*" represent facts the planner's inference engine derived directly from the given facts the user provided to the planner.

Preferred Lifestyle facts that are marked with "prelim" are facts derived from the preferred lifestyle PROLOG code that indicate the planner's preliminary answer to the corresponding preferred lifestyle choice, future financial objective or potential life-changing event. The facts marked with "prelim" represent facts the planner's inference engine derived directly from the given facts entered by the user in combination with inferences drawn by the inference engine prior to and during a preferred lifestyle choices, future financial objectives and potential life-changing events analysis. The planner shows the preliminary answer to the user only if the choice, objective or event is included in knowledge database 44 or knowledge database 184, depending on which planner is being used, and the planner was not able to select the choice, objective or event directly from the given facts the user provided to the planner.

The user is allowed to change his or her selection of any preferred lifestyle choice, future financial objective or potential life-changing event the planner shows to the user. If the user changes his or her selection, the main program in the planner will replace the corresponding preferred lifestyle fact with the preferred lifestyle fact that corresponds to the user's input.

Within the next year:
My income will increase.
   Preferred Lifestyle_fact(income_increasing)
   Preferred Lifestyle_fact(income_not_increasing) prelim
My income will decrease.
   Preferred Lifestyle_fact(income_decreasing)
   Preferred Lifestyle_fact(income_not_decreasing) prelim
I will be retiring.
   Preferred Lifestyle_fact(show_retiring_option)
   Preferred Lifestyle_fact(do_not_show_retiring_option) ***
   Preferred Lifestyle_fact(retiring)
   Preferred Lifestyle_fact(not_retiring)
   Preferred Lifestyle_fact(retiring_not_applicable) prelim I will be having a biological child.
    Preferred Lifestyle_fact(show_having_biological_child_option)
    PreferredLifestyle_fact(do_not_show_having_biological_option) ***
    Preferred Lifestyle_fact(having_biological_child)
    Preferred Lifestyle_fact(not_having_biological_child) prelim
I will adopt a child.
    Preferred Lifestyle_fact(show_adopting_child_option) ***
    Preferred Lifestyle_fact(do_not_show_adopting_child_option)
    Preferred Lifestyle_fact(adopting_child)
    Preferred Lifestyle_fact(not_adopting_child) prelim
One of my children will leave the home.
    Preferred Lifestyle_fact(show_leaving_nest_option)
    Preferred Lifestyle_fact(do_not_show_leaving_nest_option)***
    Preferred Lifestyle_fact(child_leaving_nest)
    Preferred Lifestyle_fact(child_not_leaving_nest)
    Preferred Lifestyle_fact(child_leaving_nest_not_applicable) prelim
I will buy or sell an RV.
    Preferred Lifestyle_fact(show_rv_option) ***
    Preferred Lifestyle_fact(do_not_show_rv_option)
    Preferred Lifestyle_fact(buying_or_selling_rv)
    Preferred Lifestyle_fact(not_buying_or_selling_rv) prelim Determination of Menu and Submenus to be Shown to the User After collecting, categorizing and storing the facts relating to the user's preferred lifestyle choices, future financial objectives and potential life-changing events as exemplified above, the planner 40 in FIG. 1 or the combination of planners 120 and 180 in FIG. 2 present the user with a customized set of menus and submenus that reflects the user's preferred lifestyle, future financial objectives and potential life-changing events. The planner starts that process by determining which menus and submenus should be shown to the user.

The planner customizes the set of menus and submenus for the user by having its inference engine operate on the facts the user entered into the planner combined with inferences drawn by the inference engine prior to and during this menu and submenu analysis to draw logical inferences about the menus and submenus that should be shown to the user and then, based on those conclusions, the planner will (i) from a finite set of menus and submenus, delete those menus and submenus that appear to be irrelevant to the user; and (ii) reinstate in the finite set of menus and submenus those menus and submenus that the inference engine determines it deleted earlier but, based on new facts, are relevant to the user. In that fashion, the user can select menus and submenus without the user having to consider menus and submenus that are not pertinent to the user. The planner retrieves the information it needs from knowledge database 44 of FIG. 1 or knowledge database 184 of FIG. 2, depending on which planner is being used.

The planner stores the menus and submenus to be shown to the user in knowledge database 44 in FIG. 44 or knowledge database 184 in FIG. 2, depending on which planner is being used. The menus and submenus are stored in the form of facts and are available for later use by the planner. In addition to storing those menus and submenus in the form of facts in knowledge database 44 or knowledge database 184, the planner also stores other facts and inferences that are available for later use by the planner.

The code shown below is a example of code that can be used to collect the menus (e.g., Housing) and submenus (e.g., Cable, Phone and Recreational Vehicle) that the planner shows to the user. The code shown below results from applying well-known PROLOG language coding techniques in the planner's inference engine to the facts the user entered into the planner combined with inferences drawn by the inference engine prior to and during a menu and submenu analysis. The inference engine stores such facts and the facts that drive such facts in knowledge database 44 or knowledge database 184 depending upon the planner being used. The inference engine uses all of those facts to derive numerous other facts about the user by applying well-known forward-chaining and/or backward-chaining techniques to given rules such as those that result from behavioral science studies of consumer decision-making.

Menu Items fact that are marked with "*" are facts derived from the menu and submenu PROLOG code that directs the main program in the planner 40 in FIG. 1, or in the combination of planners 120 and 180 in FIG. 2, to show or not to show the corresponding menu and submenu to the user. The menu Item facts marked with "*" represent facts that the planner's inference engine derived directly from the given facts the user provided to the planner.

Menu Items facts that are marked with "prelim" are facts derived from the menu and submenu PROLOG code that indicate the planner's preliminary answer to the corresponding menu and submenu fact. The facts marked with "prelim" represent facts the planner's inference engine derived directly from the given facts entered by the user in combination with inferences drawn by the inference engine prior to and during a menu and submenu analysis. The planner shows the menus or submenus marked with "prelim" to the user only if the menu and submenu is included in knowledge database 44 or knowledge database 184, depending on which planner is being used, and the planner was not able to select the menu or submenu directly from the given facts the user provided to the planner.

Housing
    Cable
    Menu Items_fact(show housing_cable_menu) ***
    Phone
    Menu Items_fact(show_housing_phone_menu)***
    Recreational Vehicle
    Menu Items_fact(show_housing_rv_menu)
    Menu Items_fact(do_not_show_housing_rv_menu) ***

Determination of Action Plans to be Used by the Planner

After collecting, categorizing and storing the facts relating to the menus and submenus to be shown to the user, the planner 40 in FIG. 1 or the combination of planners 120 and 180 in FIG. 2 present the user with a customized set of action plans that reflects the user's preferred lifestyle, future financial objectives and potential life-changing events and reflects the other facts the user entered into the planner combined with inferences drawn by the inference engine prior to and during this action plan analysis.

The customized set of action plans the planner presents to the user is divided into groups of individual action plans. Each group is linked to and accessed by the user by means of the menus and submenus. The planner selects from each group of individual action plans the single action plan in the group that the planner's inference engine concludes is best for the user given the user's preferred lifestyle, future financial objectives and potential life-changing events and other facts the user entered into the planner combined with inferences drawn by the inference engine prior to and during this action plan analysis. The planner retrieves the data it needs for that analysis from knowledge database 44 of FIG. 1 or knowledge database 184 of FIG. 2, depending on which planner is being used.

The planner selects from each group of individual action plans the single action plan in the group that the planner's inference engine concludes is best for the user even if the planner does not show the corresponding menu and submenu to the user. However, the planner will not show the group of individual action plans nor show the planner's selection within the group to the user if the planner does not show the group's corresponding menu and submenu to the user.

From each group of individual action plans the planner shows to the user, the user can (i) accept the action plan the planner selects for the user, or (ii) manually select another action plan in that same group, or (iii) manually add to that same group by typing in his or her own action plan. In that fashion, the user can play "What-if?" and develop a comprehensive financial plan of action that is acceptable to the user without the user having to consider individual action plans that are not pertinent to the user. If the user types in his or her own action plan, then the planner 40 in FIG. 1 or the combination of planners 120 and 180 in FIG. 2 will use artificial intelligence including rules and inference engines, natural programming and mathematical calculations to predict what statement the user is making about his or her preferred action plan and verify the conclusion with the user before including that action plan in the group of individual action plans.

The code shown below is a example of code that can be used to present the customized set of action plans to the user. The example shows a sample menu called "Housing," and three sample submenus called Cable, Phone and Recreational Vehicle. The code that is shown below each submenu results from applying well-known PROLOG language coding techniques in the planner's inference engine to the facts the user entered into the planner combined with inferences drawn by the inference engine prior to and during a action plans analysis. The inference engine stores such facts and the facts that drive such facts in knowledge database 44 or knowledge database 184 depending upon the planner being used. The inference engine uses all of those facts to derive numerous other facts about the user by applying well-known forward-chaining and/or backward-chaining techniques to given rules such as those that result from behavioral science studies of consumer decision-making.

The action plan facts marked with "*" are facts that direct the main program in the planner 40 in FIG. 1 or in the combination of planners 120 and 180 in FIG. 2** to select and recommend to the user the action plan that corresponds to the fact. The planner can notified the user of its recommendation in a variety of suitable ways including by parking a visible icon next to the recommended action plan.

The code used in the planner includes the following technique: If the facts collected throughout the planner 40 in FIG. 1 or throughout the combination of planners 120 and 180 in FIG. 2 for 500 or more prior households are identical to the facts collected throughout the planner for the user and at least 51% of those 500 or more prior households (i.e., at least 255 prior households) used one or more identical individual action plans, then for those identical individual action plans only the planner will override the action plan code and the planner will select the identical action plans for the user that are used by the 51% majority.

The planner allows the user to change his or her selection of any individual action plan for any individual action plan that the planner shows to the user. If the user changes his or her selection, the planner will replace the corresponding action plan fact with the action plan fact that corresponds to the user's input and the planner will use the user's action plan selection throughout the planning process.

However, if the user changes his or her selection of any given individual action plan the planner will not revise its original visual notification to the user of the best individual action plan to use. Rather, the planner will continue to notify the user of the planner's original action plan recommendation in a variety of suitable ways including by parking a visible icon next to the planner's original recommendation.

The planner stores the information related to the action plans in knowledge database 44 in FIG. 44 or knowledge database 184 in FIG. 2, depending on which planner is being used, in the form of facts which are available for later use by the planner.

Housing
Cable
    Action Plan_fact(prefers_no_cable)
    Action Plan_fact(prefers_basic_cable)
    Action Plan_fact(prefers_family_cable) ***
    Action Plan_fact(prefers_movie_cable)
Phone
    Action Plan_fact(prefers_no_phone_service)
    Action Plan_fact(prefers_land_line_phone_only)
    Action Plan_fact(prefers_limited_cell_phone_only)
    Action Plan_fact(prefers_unlimited_cell_phone_only)
    Action Plan_fact(prefers_land_line_and_limited_cell_phone) ***
    Action Plan_fact(prefers_land_line_and_unlimited_cell_phone
Recreational Vehicle
    Action Plan_fact(prefers_not_to_own_rv) ***
    Action Plan_fact(prefers-to_purchase_rv)
    Action Plan_fact(prefers_to keep_old_rv)

Selecting Advertisements to be Shown to the User upon the User's Demand

The planner 40 in FIG. 1 or the combination of planners 120 and 180 in FIG. 2 provide for on-demand viewing by the user of advertisements for information, goods and services for use in implementing any given individual action plan selected by the planner or the user as exemplified in the action plan process above. The advertisements the planner makes available for viewing by the user are in concert with the user's geographic location, current lifestyle and financial circumstances and objectives, preferred lifestyle and potential life-changing events, and probable future financial circumstances and objectives and the individual action plans the user chooses to implement.

The planner determines which advertisements should be available to the user upon his or her demand by having the planner's inference engine operate on the facts the user entered into the planner combined with inferences drawn by the inference engine prior to and during an advertisement analysis to draw logical inferences about which advertisements should be made available to the user and then, based on those conclusions, the planner will (i) from a finite set of advertisements, delete those advertisement that appear to be irrelevant to the user; and (ii) reinstate in the finite set of advertisements those advertisements the inference engine determines it deleted earlier but, based on new facts, are relevant to the user. In that fashion, the user can see advertisements without having to see advertisements that are not pertinent to user. The user can demand to see any advertisement the planner makes available to the user in, a variety of suitable ways including clicking on a "Shop" button which the planner locates next to each individual action plan the planner or user selected. The planner retrieves the information it needs from knowledge database 44 of FIG. 1 or knowledge database 184 of FIG. 2, depending on which planner is being used.

The planner stores the data related to advertisements in knowledge database 44 in FIG. 44 or knowledge database 184 in FIG. 2, depending on which planner is being used. The answers are stored in the form of facts and are available for later use by the planner. In addition to storing those answers in the form of facts in knowledge database 44 or knowledge database 184, the planner also stores other facts and inferences that are available for later use by the planner.

The code shown below is a example of code that can be used to select the advertisements the planner makes available to the user upon the user's demand. The example shows a sample menu called "Housing," and three sample submenus called Cable, Phone and Recreational Vehicle. Below each submenu is shown a classification of advertisements. The code shown below each classification results from applying well-known PROLOG language coding techniques in the planner's inference engine to the facts the user entered into the planner combined with inferences drawn by the inference engine prior to and during an advertising analysis. The inference engine stores such facts and the facts that drive such facts in knowledge database 44 or knowledge database 184 depending upon the planner being used. The inference engine uses all of those facts to derive numerous other facts about the user's by applying well-known forward-chaining and/or backward-chaining techniques to given rules such as those that result from marketing and behavioral science studies of consumer decision-making.

The advertisement facts that are marked with "\*\*\*" are facts derived from the advertisement PROLOG code that direct the main program in the planner 40 in FIG. 1 or in the combination of planners 120 and 180 in FIG. 2 to show or not to show the corresponding advertisement to the user upon the user's demand.

Housing
  Cable
    movie network ads
      Advertisement_fact(show_movie_network_ads)
      Advertisement_fact(do_not_show_movie_network_ads) \*\*\*
  Phone
    long distance supplier ads
      Advertisement_fact(show_ld_supplier_ads) \*\*\*
      Advertisement_fact(do_not_show_ld_supplier_ads)
    cell phone supplier ads
      Advertisement_fact(show_cell_phone_supplier_ads) \*\*\*
      Advertisement_fact(do_not_show_cell_phone_supplier_ads)
  Recreational Vehicle
    rv dealer ads
      Advertisement_fact(show_rv_dealer_ads)
      Advertisement_fact(do_not_show_rv_dealer_ads) \*\*\*
    rv accessory ads
      Advertisement_fact(show_rv_accessory_ads)
      Advertisement_fact(do_not_show_rv_accessory_ads) \*\*\*

Determination of Mathematical Probability

Figure 5:
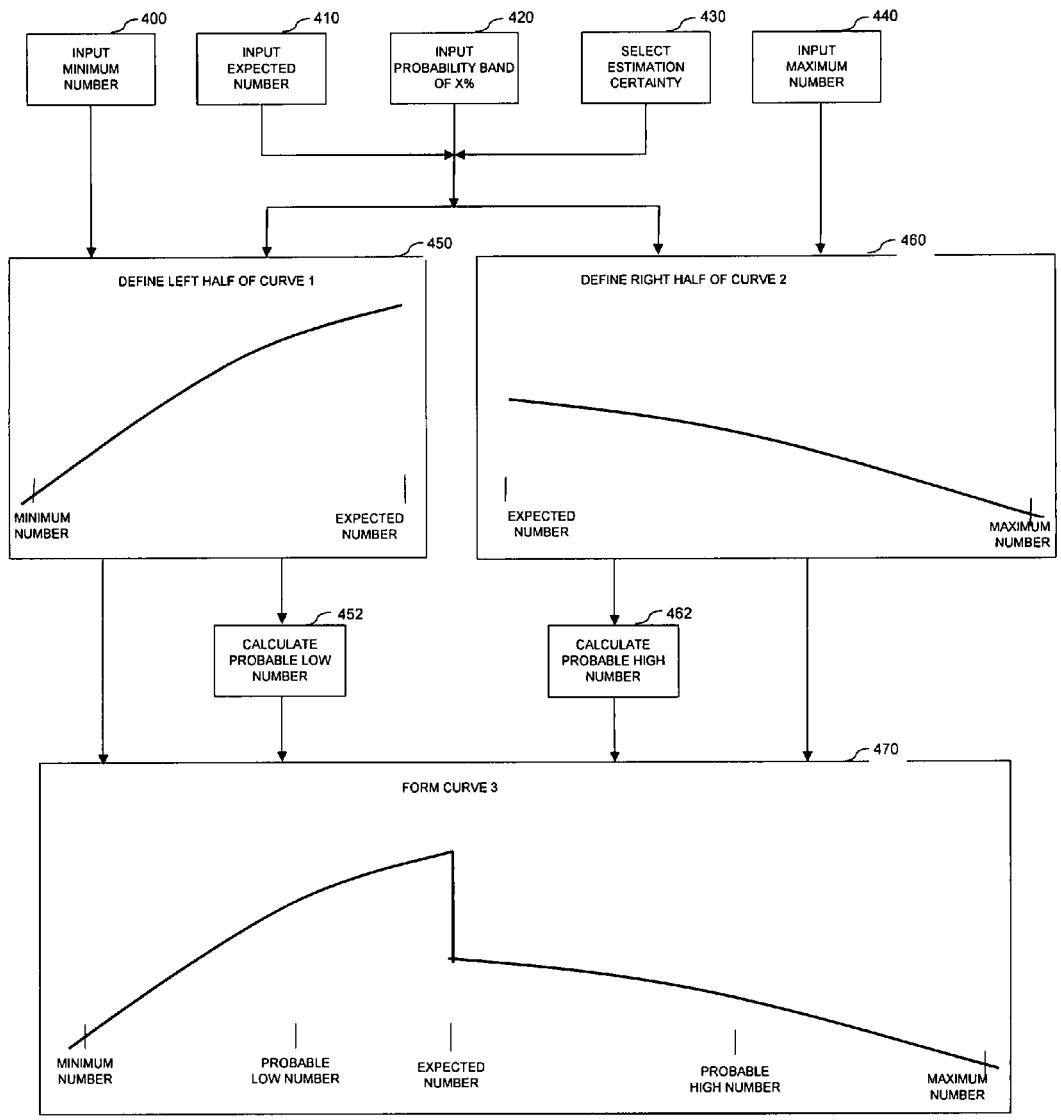
FIG. 5 is a diagram showing the method that is used in the invention to calculate the mathematical probability that the user can successfully implement actions included in the plans of financial action and financial budget.

FIG. 5 depicts another aspect of the invention for quantifying the mathematical probability of achieving success as a result of taking a given action or combinations of given actions. Rather than merely presenting the user with a single numerical representation of the financial result of implementing a given individual action or a combination of given individual actions, or presenting the user with a minimum and maximum number that represent the financial result of implementing a given individual action or a combination of given individual actions, the invention helps the user make financial decisions by selecting a mathematical probability percentage and calculating and presenting to the user a probable low number and a probable high number that the financial result of implementing a given individual action or a combination of given individual actions will fall within given the mathematical probability percentage selected.

To that end, a minimum number, an expected number, a probability band of X % and a maximum number are inputted into this aspect of the invention, either by the software associated with the invention or by the user of the invention. After receiving the above inputs, the invention calculates a probable low number and probable high number, and the probability band of X % becomes the mathematical probability that the financial result of an action or combination of actions will fall between the probable low number and the probable high number. In FIG. 5 the inputting of the minimum number is identified by box 400, the inputting of the expected number is identified by box 410, the inputting of the probability band of X % is identified by box 420, the inputting of the maximum number is identified by box 440, the calculating of the probable low number is identified by box 452 and the calculating of the probable high number is identified by box 462.

To calculate the probable low number we use the first of the two normal distribution curves, henceforth referred to as Curve 1. The whole of Curve 1 is not identified in FIG. 5. However, defining the left half of Curve 1 is identified by box 450 in FIG. 5. To calculate the probable high number, we use the second of the two normal distribution curves, henceforth referred to as Curve 2. The whole of Curve 2 is not identified in FIG. 5. However, defining the right half of Curve 2 is identified by box 460 in FIG. 5. Curve 1 and Curve 2 are normal distribution curves that, as with any normal distribution curve, can be defined by a mean ($\mu$) and standard deviation ($\sigma$), and their shape and area under each curve is symmetrical around their mean.

To calculate the probable low and probable high numbers, the probability band of X % identified by box 420 is applied to both the whole of Curve 1 and to the whole of Curve 2. However, to define Curve 1 and Curve 2, an "estimation certainty" identified by box 430 must be selected that (i) defines the area under Curve 1 between the minimum number identified by box 400 and the expected number identified by box 410, (ii) defines the area under Curve 2 between the maximum number identified, by box 440 and the expected number identified by box 410, (iii) encompasses the probability band of X % identified by box 420 and (iv) does not significantly reduce the accuracy of the calculated probable low number identified by box 452 nor the accuracy of the calculated probable high number identified by box 462.

By definition, the area under any normal distribution curve is 1 and that area is distributed symmetrically with respect to its $\mu$. Theoretically then the estimating certainty is also 1. Thus, the mathematical probability of the financial result lying between the minimum number identified by box 400 and the maximum number identified by box 440 is theoretically 100%. However, an estimation certainty of less than 1, such as 0.99, is used in the calculations. A 0.99 estimation certainty represents 99% of the area under each curve. The reason for using an estimation certainty of less than 1 is discussed in item "c" below.

Defining the left half of Curve 1 identified by box 450 in FIG. 5. To define the whole of Curve 1:

a) Assume that μ of Curve 1 is equal to the expected number identified by box 410 in FIG. 5. Then, to derive its σ, b) Assume that the area under the whole of Curve 1 between the expected number identified by box 410 and the minimum number identified by box 400 is equal to one half of the estimation certainty identified by box 430. That is a valid assumption since the estimating certainty defines a portion of the total area under the whole of Curve 1 and the total area under the whole of Curve 1 is symmetrical with respect to the curve's μ.

c) The unique coordinate of the standard normal curve that corresponds to the minimum number identified by box 400 is then determined. That is the coordinate of the standard normal curve that results in the same area under the standard normal curve between μ of the standard normal curve and the coordinate as is between μ and the minimum number under Curve 1. That coordinate can be thought of as the standardized variable that corresponds to the minimum number identified by box 400. As an example, for an estimation certainty of 0.99, a table or any other well-known means that provides the areas under the standard normal curve would be used to find a coordinate of negative 2.576 (−2.576). Note that if the value of the estimation certainty identified by box 430 had been "1", the minimum number identified by box 400 could correspond to any of the infinite number of coordinates between −∞ and −3.9. Therefore, an estimation certainty identified by box 430 of less than 1 is selected because such a value is easier to work with but yet is sufficiently accurate for the application.

d) By using the definition of a standardized variable a is calculated for the whole of Curve 1 using the formula:

σ=(minimum number−expected number)/(the standardized variable that corresponds to the minimum number).

e) Since the shape of any normal distribution curve is symmetrical around the mean, the left half of Curve 1 identified by box 450 is defined by merely selecting the half of the whole of Curve 1 that is to the left of its mean.

Defining the right half of Curve 2 is identified by box 460 in FIG. 5. To define the whole of Curve 2:

f) As with Curve 1, assume that μ of Curve 2 is equal to the expected number identified by box 410. Then, to derive its σ, g) Assume that the area under the whole of Curve 2 between the expected number identified by box 410 and the maximum number identified by box 440 is equal to one half of the estimation certainty identified by box 430. That is a valid assumption since the estimating certainty defines a portion of the total area under the whole of Curve 2 and the total area under the whole of Curve 2 is symmetrical with respect to the curve's μ.

h) Find the unique coordinate of the standard normal curve that corresponds to the maximum number identified by box 440. That is the coordinate of the standard normal curve that results in the same area under the standard normal curve between μ of the standard normal curve and the coordinate as is between μ and the maximum number under the whole of Curve 2. That coordinate can be taken as the standardized variable that corresponds to the maximum number identified by box 440. Note that both the area under the whole of Curve 2 between μ and the maximum number identified by box 440 and the area under the whole of Curve 1 between μ and the minimum number identified by box 400 are equal to one half of the estimation certainty identified by box 430. Thus, the negative of the standardized variable that corresponds to the minimum number of Curve 1 can be used. As an example, for an estimation certainty of 0.99, use 2.576.

i) By using the definition of a standardized variable, σ for the whole of Curve 2 is calculated by using the formula:

ρ=(maximum number−expected number)/(the standardized variable that corresponds to the maximum number).

j) Since the shape of any normal distribution curve is symmetrical around its mean, the right half of Curve 2 identified by box 460 is defined by selecting the half of Curve 2 that is to the right of its mean.

The calculation of the probable low number is identified by box 452 in FIG. 5. To calculate the probable low number:

k) Assume that the area under the whole of Curve 1 between the expected number identified by box 410 and the probable low number is equal to one half of the probability band of X % identified by box 420. That is a valid assumption since the probability band of X % is chosen to be symmetrical with respect to the curve's μ. It would also be mathematically correct to choose the probability band of X % identified by box 420 to be asymmetrical with respect to the curve's μ, however, choosing the probability band of X % to be symmetrical with respect to the curve's μ is the most appropriate for this application.

l) Find the unique coordinate of the standard normal curve that corresponds to the probable low number identified by box 452. That is the coordinate of the standard normal curve that results in the same area under the standard normal curve between μ of the standard normal curve and the coordinate as is between μ and the probable low number under Curve 1. That coordinate can be thought of as the standardized variable that corresponds to the probable low number.

m) Using the definition of a standardized variable, calculate the probable low number identified by box 452 by using the formula:

probable low number=((the standardized variable that corresponds to the probable low number)*(σ for Curve 1))+the expected number The calculation of the probable high number is identified by box 462 in FIG. 5. To calculate the probable high number:

n) Assume that the area under the whole of Curve 2 between the expected number identified by box 410 and the probable high number identified by box 462 is equal to one half of the probability band of X % identified by box 420. That is a valid assumption for the same reason given in step "k" above for the calculation of the probable low number.

o) Find the unique coordinate of the standard normal curve that corresponds to the probable high number identified by box 462. That is the coordinate of the standard normal curve that results in the same area under the standard normal curve between μ of the standard normal curve and the coordinate as is between μ and the probable high number under Curve 2. This coordinate can be thought of as the standardized variable that corresponds to the probable high number.

p) Using the definition of a standardized variable, calculate the probable high number identified by box 462 by using the formula:

probable high number=((the standardized variable that corresponds to the probable high number)*(σ for Curve 2))+the expected number After defining the left half of Curve 1 identified by box 450 and the right half of Curve 2 identified by box 460, form Curve 3 as identified by box 470 in FIG. 5. Curve 3 is formed by combining the left half of Curve 1 identified by box 450 with the right half of Curve 2 identified by box 460 to form one probability curve. Since the whole of Curve 1 of the whole of Curve 2 are normal distribution curves, the area under Curve 3 is equal to 1. Furthermore, since the whole of Curve 1 and the whole of Curve 2 are normal distribution curves, the area under the left half of Curve 1 identified by box 450 is equal to the area under the right half of Curve 2 identified by box 460. That means one half of the area under Curve 3 identified by box 470 is below the expected number and one half of the area under Curve 3 is above the expected number, which implies that the financial result for a given individual action or combinations of given individual actions has as the same chance of being below the expected number as being above the expected number.

Further, both the area under the left half of Curve 1 identified by box 450 between the expected number identified by box 410 and the probable low number and the area under the right half of Curve 2 identified by box 460 between the expected number identified by box 410 and the probable high number are equal to one half of the probability band of X % identified by box 420. Therefore, the area under Curve 3 identified by box 470 between the probable low number and the probable high number is equal to the probability band of X % identified by box 420, which means that there is an X percent chance that the financial result for a given individual action or a combination of given individual actions will fall between the probable low number depicted in box 470 and probable high number depicted in box 470.

Practical Applications of the Invention

The invention described herein results in the following practical applications:

A. Creating, displaying and/or printing financial education, information and advice that coincide with the user's geographic location, current lifestyle and financial circumstances and objectives, preferred lifestyle and potential life-changing events, and probable future financial circumstances and objectives and that help the user make spending and saving decisions.

B. Creating, displaying and/or printing individual financial actions, a given combination of individual actions and a financial plan of action that allow the user to see all of the actions that the user must take either now or in the future to acquire goods and services that coincide with the user's geographic location, current lifestyle and financial circumstances and objectives, preferred lifestyle and potential life-changing events, and probable future financial circumstances and objectives.

C. Creating, displaying and/or printing individual actions, combinations of individual actions and a financial plan of action that allow the user to see the anticipated financial results of the user implementing a given individual action, a given combination of individual actions or the financial plan of action while considering the geographic location, current lifestyle and financial circumstances and objectives, preferred lifestyle and potential life-changing events, and probable future financial circumstances and objectives so that the user can include those anticipated financial results in financial decision-making.

D. Creating, displaying and/or printing individual actions, combinations of individual actions and a financial plan of action to which are attached mathematical probabilities of success that allow the user to see the mathematical probability of the user achieving a given individual action, a given combination of individual actions or the financial plan of action while considering the geographic location, current lifestyle and financial circumstances and objectives, preferred lifestyle and potential life-changing events, and probable future financial circumstances and objectives so that the user can include those mathematical probabilities of success in their financial decision-making, E. Creating, displaying and/or printing the user's financial budget that allows the user to coordinate its monthly spending with the financial plan of action.

F. Selecting and displaying advertisements that allow the user to shop for goods and services that coincide with the user's geographic location and the financial plan of action and monthly financial budget the invention created.

G. Displaying certain advertisements for goods and services only after the user indicates to the invention that he or she wants to see those advertisements thereby saving users from having to see advertisements that are not pertinent to his or her geographic location and the financial plan of action and monthly financial budget the invention created.

H. Simplifying the user's shopping process by facilitating contacts via face-to-face contact, Internet hyperlinks and email, telephone, facsimile, letter, video conference, and the like with those vendors whose goods, services and geographic location coincide with the financial plan of action and monthly financial budget the invention created.

I. Benefiting certain vendors by displaying their advertisements to users whose geographic location, current lifestyle and financial circumstances and objectives, preferred lifestyle, and probable future financial circumstances and objectives coincide with the vendor's target market.

J. Creating and using a database of behavior that is based on the actual and planned actions and purchasing patterns of households and allowing vendors who deal with users to make better decisions when those decisions depend on the user's planned actions and purchasing patterns.

K. Creating and using a database of household financial success that is based on the demographics, practices and actual financial successes of households and allowing vendors who deal with households to make better decisions when those decisions depend on the user's potential future financial success.

SUMMARY

In summary, the invention relates to a method of creating and implementing financial plans of action for achieving individual lifestyle choices using a personal computer and software comprising:

1. Collecting and storing facts provided by a user regarding the user's stage of life, geographic location and current financial circumstances;
2. Collecting, deriving and storing facts regarding the user's current and preferred lifestyle;
3. Using a computer system including artificial intelligence for deriving and storing plans of action and a financial budget that are consistent with the given and derived facts regarding user's stage of life, current and preferred lifestyle, and current and probable future financial circumstances;
4. Calculating and presenting to the user the effects of implementing the plans of action on the user's current and probable future financial circumstances;

5. Identifying to the user potential problems with the user's current and probable future financial circumstances and plans of action;
6. Providing the user with education, guidance and mentoring designed to identify and correct or avoid potential future financial problems in respect of the user's financial circumstances; and
7. Identifying to the user prices and potential suppliers of goods and services for implementing the user's plans of action in a manner consistent with the user's financial circumstances and financial objectives.

Having thus described our invention, we now claim:

1. A method of creating plans of financial actions on a computer system which includes an electronic control unit, input and output interface devices, computer accessible memory, internet communication device, communications hardware for accessing the internet and internet databases, and computer executable software including an operating system, an internet search engine, calculating and organizing programming, and artificial intelligence with rules and inference engine and a knowledge database, said method comprising:

inputting to said electronic control unit, via said input device, facts regarding geographic location, stage of life, lifestyle, anticipated life-changing events, risk tolerance, financial circumstances and financial goals;

storing said input facts in said computer accessible memory;

causing said operating system and artificial intelligence to respond to said input facts by (i) searching said computer accessible memory and said internet databases for information and data related to persons with similar geographic location, stage of life, lifestyle, life-changing events, risk tolerance, financial circumstances and financial goals, (ii) retrieving from said internet databases information and data similar to said input facts, and (iii) calculating and inferring from said input facts and said information and data a plan of financial actions consistent with said input facts and said information and data;

storing said information and data retrieved from said internet databases and said plan of financial actions in said computer accessible memory;

inputting to said electronic control unit, via said input device, at least one action chosen from said plan of financial actions;

storing said at least one action chosen from said plan of financial actions in said computer accessible memory;

calculating the probability that said at least one action chosen from said plan of financial actions can be achieved consistent with the risk tolerance, anticipated life-changing events, lifestyle, financial circumstances and financial goals contained in said computer accessible memory by executing the steps of:

applying said calculating programming to said financial plan of actions and the information and data stored in said computer accessible memory to (i) calculate the estimated minimum, expected and maximum financial outcomes that would result from implementing said at least one action chosen from said plan of financial actions, (ii) set the means of two separate normal distribution curves equal to said estimated expected financial outcome, and (iii) set the estimating certainty of each normal distribution curve to 0.99;

storing in said computer accessible memory said estimated minimum, expected and maximum financial outcomes, said means, and said estimating certainty;

applying said calculating programming to calculate the standard deviation of the first of said two separate normal distribution curves ($\sigma_1$) and the standard deviation of the second of said two separate normal distribution curves ($\sigma_2$) as determined by the formulae:

$\sigma 1$=(said estimated minimum financial outcome less said estimated expected financial outcome)/(−2.576)

$\sigma 2$=(said estimated maximum financial outcome less said estimated expected financial outcome)/(2.576);

storing said first and second standard deviation values $\sigma_1$ and $\sigma_2$ in said computer accessible memory;

inputting to said electronic control unit, via said input device, an acceptable percentage chance of a successful financial outcome if said at least one action chosen from said plan of financial actions is implemented;

storing said acceptable percentage chance in said computer accessible memory;

applying said calculating programming to calculate the estimated probable low and probable high financial outcomes of implementing said at least one action chosen from said plan of financial actions as determined by the following formulae:

estimated probable low financial outcome=((the standardized variable that corresponds to the area under one half of the standard normal curve that equals one half of said acceptable percentage chance)*($\sigma_1$))+(said estimated expected financial outcome)

estimated probable high financial outcome=((the standardized variable that corresponds to the area under one half of the standard normal curve that equals one half of said acceptable percentage chance)*($\sigma_2$))+(said estimated expected financial outcome);

storing said estimated probable low financial outcome and said estimated probable high financial outcome in said computer accessible memory; and applying said organizing programming to said information and data stored in said computer accessible memory to display on said output device said plan of financial actions together with said acceptable percentage chance that the financial outcome of implementing said at least one action chosen from said plan of financial actions will fall between said estimated probable low and high financial outcomes.

* * * * *